(12) United States Patent
Yasin

(10) Patent No.: US 8,583,419 B2
(45) Date of Patent: Nov. 12, 2013

(54) LATENT METONYMICAL ANALYSIS AND INDEXING (LMAI)

(76) Inventor: Syed Yasin, Bangalore (IN)

(*) Notice: Subject to any disclaimer, the term of this patent is extended or adjusted under 35 U.S.C. 154(b) by 1077 days.

(21) Appl. No.: 12/450,575

(22) PCT Filed: Apr. 2, 2007

(86) PCT No.: PCT/IB2007/000975
§ 371 (c)(1),
(2), (4) Date: Oct. 1, 2009

(87) PCT Pub. No.: WO2008/120030
PCT Pub. Date: Oct. 9, 2008

(65) Prior Publication Data
US 2010/0114561 A1    May 6, 2010

(51) Int. Cl.
*G06F 17/27* (2006.01)
*G06F 7/00* (2006.01)
*G06F 17/30* (2006.01)

(52) U.S. Cl.
USPC ............... 704/9; 707/706; 707/738; 707/739; 707/741

(58) Field of Classification Search
USPC .................... 704/9; 707/3, 102, 103; 715/254
See application file for complete search history.

(56) References Cited

U.S. PATENT DOCUMENTS

| | | | |
|---|---|---|---|
| 5,465,320 A | 11/1995 | Enbutsu et al. | |
| 5,706,365 A | 1/1998 | Rangarajan et al. | |
| 5,745,602 A * | 4/1998 | Chen et al. | 382/229 |
| 5,799,268 A * | 8/1998 | Boguraev | 704/9 |
| 6,122,628 A | 9/2000 | Castelli et al. | |
| 6,212,494 B1 * | 4/2001 | Boguraev | 704/9 |
| 6,470,307 B1 * | 10/2002 | Turney | 704/9 |
| 6,772,150 B1 * | 8/2004 | Whitman et al. | 707/721 |
| 6,804,688 B2 * | 10/2004 | Kobayashi et al. | 1/1 |
| 6,862,710 B1 * | 3/2005 | Marchisio | 715/206 |
| 6,944,612 B2 | 9/2005 | Roustant et al. | |
| 7,107,254 B1 | 9/2006 | Dumais et al. | |
| 7,137,065 B1 * | 11/2006 | Huang et al. | 715/205 |
| 7,346,629 B2 * | 3/2008 | Kapur et al. | 1/1 |
| 7,464,086 B2 * | 12/2008 | Black et al. | 1/1 |
| 7,536,408 B2 * | 5/2009 | Patterson | 1/1 |

(Continued)

FOREIGN PATENT DOCUMENTS

KR    10-2005-0013025    2/2005

OTHER PUBLICATIONS

Turney, "Learning algorithms for keyphrase extraction", 2000, Information Retrieval, 2(4):303-336, 2000.*

(Continued)

*Primary Examiner* — Richemond Dorvil
*Assistant Examiner* — Olujimi Adesanya
(74) *Attorney, Agent, or Firm* — Oliff & Berridge, PLC

(57) ABSTRACT

The present invention relates to Latent Metonymical analysis and Indexing (LMai) is a novel concept for Advance Machine Learning or Unsupervised Machine Learning Techniques, which uses a statistical approach to identify the relationship between the words in a set of given documents (Unstructured Data). This approach does not necessarily need training data to make decisions on matching the related words together but actually has the ability to do the classification by itself. All that is needed is to give the algorithm a set of natural documents. The method is elegant enough to classify the relationships automatically without any human guidance during the process as shown in FIGS. 6 and 7.

25 Claims, 9 Drawing Sheets

(56) References Cited

U.S. PATENT DOCUMENTS

| | | | |
|---|---|---|---|
| 7,548,910 B1* | 6/2009 | Chu et al. | 1/1 |
| 7,567,959 B2* | 7/2009 | Patterson | 1/1 |
| 7,593,932 B2* | 9/2009 | Lindh et al. | 1/1 |
| 8,090,724 B1* | 1/2012 | Welch et al. | 707/750 |
| 8,131,736 B1* | 3/2012 | Chang et al. | 707/751 |
| 2003/0177112 A1* | 9/2003 | Gardner | 707/3 |
| 2004/0088308 A1* | 5/2004 | Bailey et al. | 707/100 |
| 2004/0205457 A1* | 10/2004 | Bent et al. | 715/500 |
| 2006/0004732 A1* | 1/2006 | Odom | 707/3 |
| 2006/0074853 A1* | 4/2006 | Liu et al. | 707/1 |
| 2006/0217818 A1 | 9/2006 | Fujiwara | |
| 2007/0067289 A1* | 3/2007 | Novak | 707/6 |
| 2007/0067317 A1* | 3/2007 | Stevenson | 707/100 |
| 2007/0174255 A1* | 7/2007 | Sravanapudi et al. | 707/3 |
| 2007/0250468 A1* | 10/2007 | Pieper | 707/1 |
| 2008/0114738 A1* | 5/2008 | Chao | 707/3 |
| 2009/0150827 A1* | 6/2009 | Meyer et al. | 715/810 |
| 2009/0204609 A1* | 8/2009 | Labrou et al. | 707/5 |
| 2009/0265338 A1* | 10/2009 | Kraft et al. | 707/5 |

OTHER PUBLICATIONS

Piersman, "Knowledge-Lean Approaches to Metonymy Recognition", 2005, Thesis, School of Philosophy, Psychology and Language Sciences University of Edinburgh, pp. i-77.*

Hulth, "Improved automatic keyword extraction given more linguistic knowledge", 2003, In Proceedings of the 2003 Conference on Empirical Methods in Natural Language Processing, Japan, pp. 1-8.*

Gao et al, "Extraction of Keyterms by Simple Text Mining for Business Information Retrieval", 2005, Proc. IEEE International Conference on e-Business Engineering (ICEBE 2005), Washington DC, 2005, pp. 332-339.*

Witten et al, "Kea: Practical automatic keyphrase extraction", 1998, In Proceedings of the 4th ACM conference on Digital Libraries, pp. 1-9.*

* cited by examiner

LATENT METONYMICAL ANALYSIS AND INDEXING (LMAI)

FIELD OF THE INVENTION

Latent Metonymical Analysis and Indexing (LMai) is a novel concept for Advance Machine Learning or Unsupervised Machine Learning Techniques, which uses a mathematical approach to identify the relationship between the words in a set of given documents (Unstructured Data). This approach does not necessarily need training data to make decisions on clustering the related words together but actually has the ability to do the classification by itself. All that is needed, is to give the algorithm a set of natural documents. The algorithm is elegant enough to organize the relationships automatically without any human guidance during the process.

BACKGROUND OF THE INVENTION AND PRIOR ART

LMai is an algorithm that explains the process of how machines can identify the relationship between the words automatically and act as guidance system to humans. To realize the above statement, LMai portrays certain novel techniques, by virtue of which it is possible for a machine to make good judgment of word relationship. Hence, LMai depicts information about a novel term decomposition technique, which is used to decompose words of less importance to extract useful or informative words or Keywords from the given document. A process by which the Topic of a document is automatically extracted; and a process by which the relationship between the Topics and the Keywords is established to identify the words that are related to each other. Further, the benefits of implementing LMai into various applications are discussed. One such application being the usage of LMai in Search Engines is explained.

Usually Search Engines retrieve data based on the relevance, page rank and other related criteria. If LMai is plugged into these types of Search Engines, LMai enhances the Search Engine capability to a great extent wherein context based results is portrayed to the end user.

A point to be noted is that Search Engines, which retrieve data based on the relevance, page rank seldom portray context based results.

LMai is not a search engine from scratch; it is an algorithm that is capable of identifying the related words from a set of documents automatically. For any given domain ex: Medical for instance, it needs an expert/doctor to map the related terms together. If "Heart Surgery" were to be the Keyword, a doctor would imply "Open Heart Surgery", Minimal Invasive Heart", "Heart Attack", "Heart Bypass Surgery", "Vascular Surgery", "Angioplasty", "Cardiac Catheterization" etc to be related to "Heart Surgery". LMai defines this kind of relationship automatically without any set of training data. This is indeed a powerful feature; wherein a machine tries to behave like an expert, although not to an accuracy of 100% but it positively portrays very convincing results.

The some of the prior arts, which are related to our field of technology, are given below for the ready reference. Distinction between present technology and the prior arts also explained at the end of the prior art.

Document D1: U.S. Pat. No. 5,465,320—Method of automated learning, an apparatus therefore, and a system incorporating such an apparatus.

This invention discloses automated learning techniques by using neural networks. In order to speed up and simplify automated learning of rules by a neural network making use of fuzzy logic, data from a system is analyzed by a teaching data creation means which groups the data into clusters and then selects a representative data item from each group for subsequent analysis. The selected data items are passed to a rule extraction means which investigates relationships between the data items, to derive rules, but eliminates rules which have only an insignificant effect on the system. The results are candidate rules which are stored in a first rule base. The candidate rules are then compared with rules in a second rule base to check for duplication and/or contradiction. Only those rules which are not duplicated and not contradictory are stored in the second rule base. Hence, when fuzzy inference is used to control the system on the basis of rules in the second rule base, only valid rules which provide a significant effect on the system are used.

Document D2: United States Patent Application 20060217818 (Semantically Specified Syntactic Analysis)—Learning/thinking machine and learning/thinking method based on structured knowledge, computer system, and information generation method.

The Document D2 provides a learning machine capable of expressing/accumulating concept and semantic relation by understanding semantic relation of information as a relation between concepts after characteristics, semantic relation and structure of information and the like have been analyzed. The Document D2 is intended to realize a thinking machine in which information is inclusively collected and stored as knowledge structured based on the semantic relation of the collected information, information is generated by predetermined inference so as to have a new semantic relation in response to an inquiry or request and which can decide an optimal solution to an inquiry and the like by evaluating/deciding new generated information.

The object of D2 is achieved through a learning/thinking method based on a structured knowledge comprising: a knowledge input step for inputting inclusively collected data, information and knowledge; a knowledge structuring step in which a semantic relation is extracted from said inputted data, information and knowledge in accordance with a plurality of rules, meaning of information is analyzed based on said extracted semantic relation, a link indicates a semantic relation between a node and a node for indicating a meaning, said node and said link have structures so as to exchange their roles and structured knowledge expressed by said node and said link is stored; an information generating step for generating new information by predetermined inference such that a knowledge structured by said node and said link based on said semantic relation has new semantic content and semantic relation; a value judging step for evaluating and judging a new knowledge of generated information by verifying said information generated result with said knowledge base; a knowledge increasing step for accumulating said evaluated/judged result and new information generated knowledge in said knowledge base to increase knowledge; and an optimal solution deciding step for deciding and outputting an optimal solution in response to an inquiry or request from then outside, wherein said information generating step comprises: a relating node retrieving step for retrieving only a unit in which a relating node is stored; a relating link retrieving step for retrieving only a unit in which a relating link is stored; and a step for executing inference by using at least any one of analogical reasoning, inductive inference, abduction and association based on a retrieved result of said relating node retrieving step or said relating link retrieving step.

Document D3: U.S. Pat. No. 6,944,612 Structured Contextual Clustering Method and System in a Federated Search Engine This document discloses a federated search engine which groups search results from information sources using attributes of the search results. In grouping the search results, a first set and a second set of attributes are extracted from content in each set of search results received using information source wrappers. The first set of attributes defines a main clustering strategy, and the second set of attributes defines a sub-clustering strategy. A main grouping of the sets of search results received from the information sources is generated using the first set of attributes. The main grouping of search results includes a plurality of labeled groups with a plurality of search results in each group. A sub-grouping of search results is generated for each labeled group of search results in the main grouping of search results using the second set of attributes.

Document D4: U.S. Pat. No. 7,107,254 Probablistic Models and Methods for Combining Multiple Content Classifiers The invention applies a probabilistic approach to combining evidence regarding the correct classification of items. Training data and machine learning techniques are used to construct probabilistic dependency models that effectively utilize evidence. The evidence includes the outputs of one or more classifiers and optionally one or more reliability indicators. The reliability indicators are, in a broad sense, attributes of the items being classified. These attributes can include characteristics of an item, source of an item, and meta-level outputs of classifiers applied to the item. The resulting models include meta-classifiers, which combine evidence from two or more classifiers, and tuned classifiers, which use reliability indicators to inform the interpretation of classical classifier outputs. The invention also provides systems and methods for identifying new reliability indicators.

The probabilistic dependency models generated and trained by probabilistic dependency model builder are models that make classification predictions using a probabilistic approach to combining evidence. Examples of probabilistic dependency models include decision trees, neural networks, and Bayesian belief networks. Where the evidence considered includes the outputs of two or more classifiers, probabilistic dependency model builder can be described as a classifier combiner and is said to produce meta-classifiers. Where the evidence considered includes the outputs of only one classifier, probabilistic dependency model builder can be described as a classifier tuner. Probabilistic dependency model outputs can be of the same type as classifier outputs and often include a confidence level or utility associated with a classification decision.

Document D5: KR20050013025 Method for Knowledge Information Search Service Based on Search Engine for Classification System of Part-of-Speech on Interne A method for a knowledge information search service based on a search engine for a classification system of a part-of-speech on the Internet is provided to classify emotion as well as any terminology or field by using the classification system using the part-of-speech and offer an expansion typed knowledge information search service using the classification system. CONSTITUTION: An information search classification system uses the part-of-speech classification system. A query sentence made by including a word classified in the part-of-speech classification system is one knowledge information unit. One query sentence, which is the knowledge information unit, is classified into the search classification system by classifying each word in the query sentence into each detail part-of-speech.

Though, all the documents D1 to D5 are related to Machine learning system and method thereof, but differ in the methodology used to achieve unsupervised machine learning.

Further, none of the documents D1 to D5 disclose the machine learning by LMai-Latent Metonymical Analysis and Indexing based algorithm. The crux of our invention lies in novel mathematical approach to identify the relationship between the words in a set of given documents (Unstructured Data). This technique or the algorithm does not necessarily need training data to make decisions on matching the related words together but actually has the ability to do the classification by itself. All that is needed is to give the algorithm a set of natural documents.

Document D1 is based on automated learning techniques which are achieved by using neural networks making use of fuzzy logic whereas our technology is not based on neural networks.

Document D2 explains a learning machine capable of expressing/accumulating concept and semantic relation by understanding semantic relation of information as a relation between concepts after characteristics, semantic relation and structure of information and the like have been analyzed.

By way of comparing our technology with document D2, we can clearly make out the difference like cited technology is completely based on Semantically Specified Syntactic Analysis which is not in our case. Our instant technology is not a mere semantic relation algorithm. Our instant technology does not necessarily need training data to make decisions on matching the related words together but actually has the ability to do the classification by itself.

Neither of the documents D1 and D2 talks about unsupervised machine learning and classifying the clusters by machine itself.

Document D3 discloses a federated search engine which groups search results from information sources using attributes of the search results. The document D3 fails in explaining automated learning and classification of data into different clusters.

The document D3 Prima facie might appear to be similar to our technology but if you look at the methodology used in creating clusters and classifying the contents in clusters is distinct from our invention. It does not talk about the automated learning and classification.

Preliminary set of clusters is created using a suffix comparison method and attribute-specific normalization techniques are adapted to operate with clustering methods at and that groups search results by detecting common suffixes between attribute content. Initially, the content of each specific attribute that is to be normalized is first converted using the attribute-specific normalization techniques into a set of words, so that the clustering method is able to differentiate between standard 'text' attributes and specific attributes.

Document D4 talks about Probabilistic models and methods for combining multiple content classifiers.

The probabilistic dependency models generated and trained by probabilistic dependency model builder are models that make classification predictions using a probabilistic approach to combining evidence. Examples of probabilistic dependency models include decision trees, neural networks, and Bayesian belief networks.

This technology also mainly based on neural networks and Bayesian belief networks. This technology does not give any idea of learning data by machine automatically and classifying the data into different cluster automatically.

Document D5 is a method for a knowledge information search service based on a search engine for a classification system of a part-of-speech on the Internet is provided to classify emotion as well as any terminology or field by using the classification system using the part-of-speech.

This technology is particularly developed for searching the documents. The method used to develop classification is distinct from our technology and it does not explain about unsupervised machine learning technique. The application of this technology is limited to search engine only.

LMai as described earlier is a novel concept for Advance Machine Learning or Unsupervised Machine Learning Techniques, which depicts a methodology to extract the relationship between words automatically without any guidance given to the machine.

LMai could be boxed as a plugin to amalgamate with applications that need it. In the context of this paper LMai is boxed as a plugin to sit on top of an already existing Search Engine.

Related Algorithms:
1. PLSA
2. PLSI

OBJECTS OF THE INVENTION

The primary object of the present invention is a concept for Advance Machine Learning or Unsupervised Machine Learning Techniques, which uses a mathematical approach to identify the relationship between the words in a set of given documents (Unstructured Data).

Yet another object of the present invention is the approach that does not necessarily need training data to make decisions on matching the related words together but actually has the ability to do the classification by itself.

Still another object of the present invention is to provide an algorithm that is elegant enough to classify the relationships automatically without any human guidance during the process.

Still another object of the present invention is a novel "Single and Multi Value Term Decomposition" (SMV-TD) technique to extract keywords and optionally KeyTerms, and also to enhance the accuracy and to remove unwanted words or terms with less importance.

Still another object of the present invention is to provide a method for advance machine learning technique/Unsupervised machine learning using Latent Metonymical Analysis and Indexing (LMai) algorithm.

Still another object of the present invention is a method to identify single and multi value terms Still another object of the present invention is a method to identify Topic of a given document based on its content

SUMMARY OF THE INVENTION

The present invention relates to a method for advance and/or unsupervised machine learning by Latent Metonymical Analysis and Indexing (LMai), said method comprising steps of inputting natural documents; eliminating special characters to count number of words within the given document, filtering the contents based on the predefined stop-words and calculating the fraction of the stop-words present in the document; determining Significant Single Value Term data set and Significant Multi Value Term data set from the document being processed; decomposing the words in Significant Single Value Term data set and Significant Multi Value Term data set to extract the Keywords of the document being processed; optionally, determining KeyTerms and their respective hand-in-hand (HiH) words automatically for further decomposition; identifying Topic in an unsupervised manner based not just on File Name but also by manipulating/comparing with various combinations of document attributes that are extracted to identify Best Topic candidates and thereafter defining an appropriate Topic based on predefined rules; and analyzing relationship between the Topics and the Keywords and thereafter indexing the Topics and their related Keywords, KeyTerms and their respective hand-in-hand terms into Metonymy cluster and KeyTerms HiH cluster respectively; also, a decomposition method to extract Keywords and KeyTerms from the documents, said method comprising steps of inputting natural documents; checking the document being processed to identify the prerequisite minimal size of data and/or word articles/words; storing the data in a sequential order as per their occurrence in the document; creating two identical instances of the data to facilitate the identification of Significant Single Value Term data set and Significant Multi Value Term data set; determining Significant Single Value Term from one of the instance of the data set and Significant Multi Value Term from the other instance of the data set starting from the highest hand-in-hand range predefined, followed by consecutive hand-in-hand range terms of lesser dimension; storing the identified Significant Single Value Term and Significant Multi Value Term of different hand-in-hand range in their respective data sets; comparing the data sets in such way that every individual hand-in-hand range term that has at least one instance of any term in Significant Single Value Term data set is extracted as a Keyword and the rest are decomposed; and optionally, determining the KeyTerms based on the extracted Keywords for further decomposition; also, a method to identify an appropriate Topic for a document based on the document content, said method comprising steps of cleaning up the File Name to remove the file dot (.) extension and any alphanumeric characters; extracting the first few predefined number of words from the beginning of the document as the Document Header; comparing each word in the File Name and each word in the Document Header with every word in Significant Single Value Term data set, to extract the words that match in two separate data sets; comparing each word in the Document Header with every word in File Name to extract the words that match in separate data set; transferring the data from the said individual data sets achieved into another data set; thereafter processing the data/words to determine frequency of each word occurrence; comparing every word in the Significant Multi Value Term data sets of a predefined range with the File Name to extract the hand-in-hand words that match in a separate data set; comparing every word in the Significant Multi Value Term data set of a predefined range with the Document Header to extract the hand-in-hand words that match in a separate data set; transferring the data from the individual data sets achieved into another separate data set; thereafter processing the data/words to determine frequency of each word occurrence; comparison of the data set, which consists of words of type Single Value Term and another data set, which consists of words of type Multi Value Term to extract those hand-in-hand words as Best Topic candidates that have at least one instance of any of the words of type Single Value Term; and defining an appropriate Topic based on predefined rules; also, a method to identify relationship between Topics and Keywords from a set of documents, said method comprising steps of, grouping the identical Topics and adding their corresponding Keywords to determine their frequency of occurrence within the group; and extracting the Keywords related to the Topic by dividing the determined frequency of each Keyword with the frequency of Topic occurrence; thereafter comparing the obtained percentage with a predefined threshold percentage limit to determine the Keyword that is related to the Topic; and also, a system for automatically identifying Keywords, KeyTerms and Topics from a set of documents and thereafter automatically identifying the metonymical/related words by Latent Metonymical Analysis and Indexing (LMai), said system comprising; document input module for providing unstructured data; means for analyzing the document; an indexing module for indexing/clustering Topics and their related words, and also KeyTerm and their HiH terms; retrieval engine to retrieve the context based results from the index/cluster; and display system to display retrieved context based results.

BRIEF DESCRIPTION OF ACCOMPANYING DRAWINGS

FIG. 8 shows schematic of LMai plug-in.

DETAILED DESCRIPTION OF THE INVENTION

Figure 1:
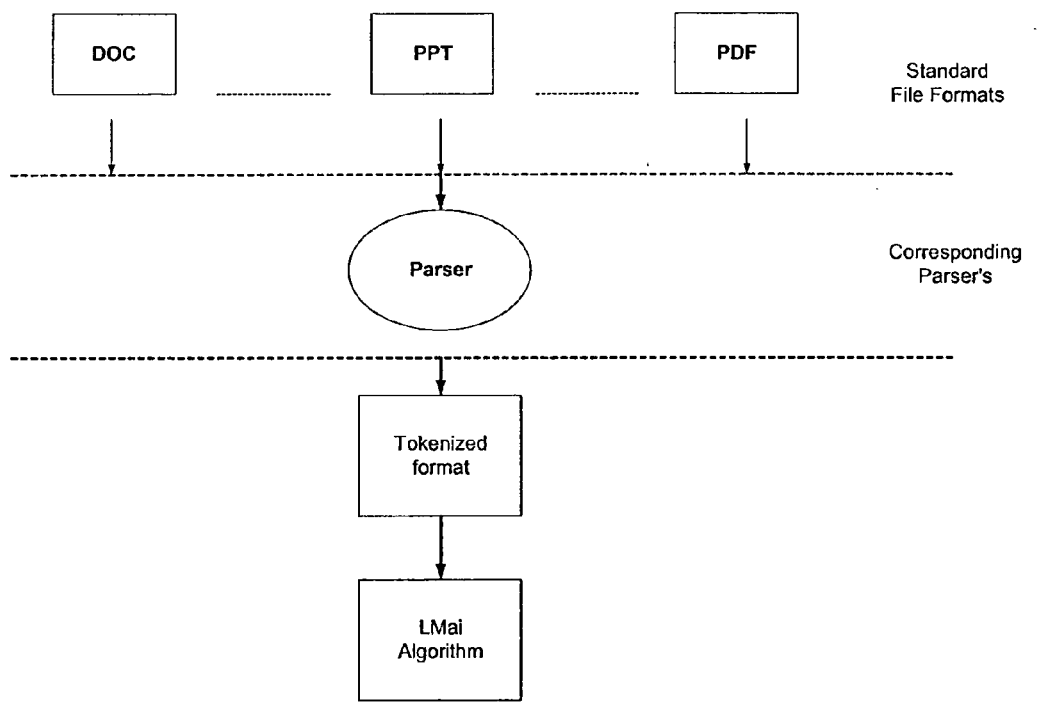
FIG. 1 shows conversion of electronic document such as a word document, a PPT file, a TXT file or a PDF or any predetermined format into a tokenized format.

The primary embodiment of the present invention is a method for advance and/or unsupervised machine learning by Latent Metonymical Analysis and Indexing (LMai), said method comprising steps of inputting natural documents; eliminating special characters to count number of words within the given document, filtering the contents based on the predefined stop-words and calculating the fraction of the stop-words present in the document; determining Significant Single. Value Term data set and Significant Multi Value Term data set from the document being processed; decomposing the words in Significant Single Value Term data set and Significant Multi Value Term data set to extract the Keywords of the document being processed; optionally, determining KeyTerms and their respective hand-in-hand (HiH) words automatically for further decomposition; Identifying Topic in an unsupervised manner based not just on File Name but also by manipulating/comparing with various combinations of document attributes that are extracted to identify Best Topic candidates and thereafter defining an appropriate Topic based on predefined rules; and analyzing relationship between the Topics and the Keywords and thereafter indexing the Topics and their related Keywords, KeyTerms and their respective hand-in-hand terms into Metonymy cluster and KeyTerms HiH cluster respectively.

In yet another embodiment of the present invention is the method does not use any training data to make decision in identifying the relationship between the words.

In still another embodiment of the present invention is the method performs the classification of relationship between the words without any human guidance.

In still another embodiment of the present invention is the method defines appropriate Topic for a given document based on its content, although the File Name or Title Name are not appropriate.

In still another embodiment of the present invention is the method identifies the documents with gibberish data or data having no proper meaning to be eliminated during indexing.

In still another embodiment of the present invention is the document is an electronic document selected from a group comprising PPT file, HTML file, DOC file, PDF file or any other predetermined format converted into tokenized format before the data is given to the method.

In still another embodiment of the present invention is the documents having stop-words less than or equal to predetermined percentage, preferably 15% are not processed further to identify Keywords and Topics.

In still another embodiment of the present invention is the method is boxed/designed in a way to act as a plug-in to connect to any typical search engine, which indexes and retrieves unstructured data.

In still another embodiment of the present invention is for every document returned by the Base Search Engine as a Search Result, LMai extracts the corresponding Topic of the document from its Index for the first few predefined number of search results returned; thereafter the frequency occurrence of each Topic is calculated and based on a predefined threshold value of frequency of the Topics, relationship is identified to obtain context based results.

In still another embodiment of the present invention is the method returns results for a given search keyword that match the Topic in LMai index along with the results returned by the base search engine.

In still another embodiment of the present invention is the method suggests the related Topics that match the search Keyword in separate sections in order to search within the Topic or to search related Topics.

In still another embodiment of the present invention is the method displays the Keywords of results returned in order for the user to select the appropriate link that matches the content they are looking for without having to traverse back and forth otherwise.

In still another embodiment of the present invention is a process the documents written in any language as long as it is tokenized.

In still another embodiment of the present invention is a method provides for advance and/or unsupervised machine learning in robots, guidance systems, knowledge management system, decision making machines and/or search engines.

In still another embodiment of the present invention is the method automatically creates personalized search profile based on the user's interest by maintaining previous search information such as various links the user visited and corresponding related Topics that are extracted upon each search.

In still another embodiment of the present invention is the profile is updated dynamically based on consecutive searches performed by the user.

In still another embodiment of the present invention is the method classifies the documents of an organization precisely without the intervention of experts during the process using training data and/or guidance to machine.

In still another embodiment of the present invention is the method depicts the percentage accuracy determined during classification and the percentage of content related to each of the sub-categories for ontology mapping.

In still another embodiment of the present invention is the documents having stop-words less than or equal to predetermined percentage is used to filter out or skip the documents of other languages.

In still another embodiment of the present invention is the metonymy/relationship index created by the method is incremental and is dynamic based on new addition of data.

In still another embodiment of the present invention is a decomposition method to extract Keywords and KeyTerms from the documents, said method comprising steps of inputting natural documents; checking the document being processed to identify the prerequisite minimal size of data and/or word articles/words; storing the data in a sequential order as per their occurrence in the document; creating two identical instances of the data to facilitate the identification of Significant Single Value Term data set and Significant Multi Value Term data set; determining Significant Single Value Term from one of the instance of the data set and Significant Multi Value Term from the other instance of the data set starting from the highest hand-in-hand range predefined, followed by consecutive hand-in-hand range terms of lesser dimension; storing the identified Significant Single Value Term and Significant Multi Value Term of different hand-in-hand range in their respective data sets; comparing the data sets in such way that every individual hand-in-hand range term that has at least one instance of any term in Significant Single Value Term data set is extracted as a Keyword and the rest are decomposed; and optionally, determining the KeyTerms based on the extracted Keywords for further decomposition.

In still another embodiment of the present invention is the document is an electronic document selected from a group comprising PPT file, HTML file, DOC file, PDF file or any other predetermined format converted into tokenized format before the data is given to the method.

In still another embodiment of the present invention is the number of words within the document is counted after eliminating special character and converting the words into small case letters.

In still another embodiment of the present invention is the document contains less than the predefined number of words, preferably 50, is not considered for further processing.

In still another embodiment of the present invention is the documents having stop-words less than or equal to predetermined percentage, preferably 15% are not processed further.

In still another embodiment of the present invention is the method automatically extracts the Keywords and KeyTerms from the document without any guidance or training data given to the said method.

In still another embodiment of the present invention is the method uses two dimensions, which are the Significant Single Value Term data set and Significant Multi Value Term data set each having the same instance of data that has the words stored in sequential order as per their occurrence in the document in order to decompose the words to identify Keywords in the document processed.

In still another embodiment of the present invention is the Significant Multi Value Term data set have its own predefined set of hand-in-hand range dimensions.

In still another embodiment of the present invention is the extraction of Significant Multi Value Term data set is carried out with the first stage being the extraction of the maximum hand-in-hand dimensional range followed by consecutive hand-in-hand range words of lesser dimension.

In still another embodiment of the present invention is the KeyTerms is optionally used for further decomposition of the Keywords.

In still another embodiment of the present invention is the KeyTerms and their corresponding hand-in-hand words are used to create an Index of KeyTerms HiH Clusters, which is incremental.

In still another embodiment of the present invention is the Keywords extracted are used to derive relationship with the identical Topics.

In still another embodiment of the present invention is the Keywords extracted are used in search results returned in order for the user to select the appropriate link that matches the content they are looking for without having to traverse back and forth otherwise.

In still another embodiment of the present invention is the method classifies the documents of an organization precisely without the intervention of experts during the process using training data and/or by guidance to machine.

In still another embodiment of the present invention is the method depicts the percentage accuracy determined during classification and the percentage of content related to each of the sub-categories based on the comparison with Keywords of the document extracted, which helps for ontology mapping.

In still another embodiment of the present invention is the method for identifying Significant Single Value Term data set from the given document comprises steps of; retrieving words from the data set stored in sequential order as per their occurrences in the document; eliminating special characters and/or word articles/words in the document by comparing with a list of predefined stop-words in order to obtain informative words in the document; processing the informative words to determine the frequency of each word occurrence; and sorting the processed words in order to extract a predefined number of words with highest frequency to identify the Significant Single Value Term.

In still another embodiment of the present invention is the document contains less than the predefined number of words, preferably 50, is not considered for further processing.

In still another embodiment of the present invention is the documents having stop-words less than or equal to predetermined percentage, preferably 15% are not processed further.

In still another embodiment of the present invention eliminates the stop-words helps in cleansing up the document content.

In still another embodiment of the present invention is identification of singular and plural forms of a word are considered as identical while determining the frequency.

In still another embodiment of the present invention is that the words are sorted in an order to extract the words with highest frequency.

In still another embodiment of the present invention is, wherein if the frequency of the last word in a data set of predefined number of words is equal to the next consecutive term frequency in the data set, then even those words are also extracted.

In still another embodiment of the present invention is, wherein the method for identifying Significant Multi Value Term data set from the given document comprises steps of; retrieving words from the data set stored in sequential order as per their occurrences in the document; extracting hand-in-hand words of a predetermined range into appropriate data sets from the retrieved words, thereafter extracting words of type Single Value Term that are left over by eliminating stop-words and void values into a different data set; processing the extracted words in each of the respective data set to determine frequency of each word occurrence; sorting the processed words in order to extract a predefined number of words with highest frequency in each of the respective data set to identify Significant Multi Value Term data sets of various predefined hand-in-hand range dimensions; and another data set with words of type Single Value Term, which is the residue after Significant Multi Value Term extraction.

In still another embodiment of the present invention is, wherein the document contains less than the predefined number of words, preferably 50, is not considered for further processing.

In still another embodiment of the present invention is, wherein the documents having stop-words less than or equal to predetermined percentage, preferably 15% are not processed further.

In still another embodiment of the present invention is, wherein singular and plural forms of a word are converted to either singular word or plural word, preferably singular word.

In still another embodiment of the present invention is, wherein the ranges of hand-in-hand words have value within the practical limits of usage, preferably 4 or 3.

In still another embodiment of the present invention is, wherein the extraction of hand-in-hand words of predetermined range is carried out with the extraction of words based on maximum hand-in-hand range dimension followed by consecutive hand-in-hand range words of lesser dimension.

In still another embodiment of the present invention is, wherein the hand-in-hand words of a predetermined range is identified by taking sequential words in the order of their occurrence from the document and adding them together with a space.

In still another embodiment of the present invention is, wherein the combination of hand-in-hand term that contain words from Stop-Lister/Stop-Words are skipped during identifying the hand-in-hand term of a predetermined range.

In still another embodiment of the present invention is, wherein during the process of identifying the hand-in-hand (HiH) term of a predetermined range, for every HiH term identified, its frequency is appended, then at every occurrence of the identified HiH term, is replaced by void values.

In still another embodiment of the present invention is, wherein the datasets used to store different dimensions of word representation comprising the words in Significant Single Value Term and their respective frequencies without the elimination of words of type Multi Value Term and Significant Multi Value Term words as per their predefined hand-in-hand range with their respective frequencies; and another data set of type Single Value Term with respective frequencies of its words after the elimination of Multi Value Terms, which is basically the residue terms left over after the extraction of hand-in-hand terms.

In still another embodiment of the present invention is, wherein the Term Decomposition is carried out by comparing the two dimensions, which are Significant Single Value Term dimension and Significant Multi Value Term dimension in such a way that every individual hand-in-hand range term that has at least one instance of any of the term in Significant Single Value Term dimension are extracted as Keywords and the rest are decomposed.

In still another embodiment of the present invention is a method to identify an appropriate Topic for a document based on the document content, said method comprising steps of cleaning up the File Name to remove the file dot (.) extension and any alphanumeric characters; extracting the first few predefined number of words from the beginning of the document as the Document Header; comparing each word in the File Name and each word in the Document Header with every word in Significant Single Value Term data set, to extract the words that match in two separate data sets; comparing each word in the Document Header with every word in File Name to extract the words that match in separate data set; transferring the data from the said individual data sets achieved into another data set; thereafter processing the data/words to determine frequency of each word occurrence; comparing every word in the Significant Multi Value Term data sets of a predefined range with the File Name to extract the hand-in-hand words that match in a separate data set; comparing every word in the Significant Multi Value Term data set of a predefined range with the Document Header to extract the hand-in-hand words that match in a separate data set; transferring the data from the individual data sets achieved into another separate data set; thereafter processing the data/words to determine frequency of each word occurrence; comparison of the data set achieved, which consists of words of type Single Value Term and another data set achieved, which consists of words of type Multi Value Term to extract those hand-in-hand words as Best Topic candidates that have at least one instance of any of the words of type Single Value Term; and defining an appropriate Topic based on predefined rules.

In still another embodiment of the present invention is, wherein singular and plural forms of a word are converted to either singular word or plural word, preferably singular word by comparing the words in the file name with the words in Document Header and Significant Single Value Term data set during File Name cleaning up process.

In still another embodiment of the present invention is, wherein the first few predefined number of words, preferably 15, in the beginning of the document are extracted as Document Header after filtering the words from the Stop-Lister and after conversion of plural forms of a word to preferably singular word.

In still another embodiment of the present invention is, wherein the frequency of each of the hand-in-hand term that is extracted as a Best Topic candidate is compared with a predefined threshold value, preferably 3 for hand-in-hand words of range 3 and preferably 2 for hand-in-hand words of range 2 to assert the correctness.

In still another embodiment of the present invention is, wherein the Topic to a given document is defined based on predefined rules and thereafter, the Best Topic candidates' data set is checked to see, if there is only one such candidate, if it is asserted then that is defined as the Topic of the document.

In still another embodiment of the present invention is, wherein if there is more than one Best Topic candidate in the data set then the frequency of each Best Topic candidate is calculated based on matching the words in Best Topic candidate with words in Significant Single Value Term data set to extract the corresponding frequency of each word that matches; Thereafter adding up the individual frequencies of each word in the Best Topic candidate to derive the Topic with highest frequency.

In still another embodiment of the present invention is, wherein if there are no Best Topic candidate's extracted, then the matching words from the comparison of Significant Single Value Term and File Name are chosen as per the sequence of the word occurrence in the File Name to define the Topic of the document.

In still another embodiment of the present invention is, wherein if there are no matching words extracted based on the comparison of words from Significant Single Value Term data set and File Name, then the collective words that are extracted based various combination of comparison of words between the File Name, the Document Header and the Significant Single Value Term data set is now compared with the words in Significant Single Value Term data set and the term match that has the highest frequency in Significant Single Value Term data set is chosen as the Topic of the document.

In still another embodiment of the present invention is, wherein if there are no matching words found from the various combination of comparison of words between the File Name, the Document Header and the Significant Single Value Term data set, then no Topic is defined to the document by the method.

In still another embodiment of the present invention is, wherein the method would extract Keywords, KeyTerms and Topic for every document processed based on the predefined rules.

In still another embodiment of the present invention is a method to identify relationship between Topics and Keywords from a set of documents, said method comprising steps of; grouping the identical Topics and adding their corresponding Keywords to determine their frequency of occurrence within the group; and extracting the Keywords related to the Topic by dividing the determined frequency of each Keyword with the frequency of Topic occurrence; thereafter comparing the obtained percentage with a predefined threshold percentage limit to determine the Keyword that is related to the Topic.

In still another embodiment of the present invention is, wherein the threshold percentage is a value less than or equal to 100.

In still another embodiment of the present invention is, wherein each cluster or element represents the Topic and its related words in LMai index created.

In still another embodiment of the present invention is, wherein if a set of new documents are added, then the New Topics extracted from the documents are compared with the existing Topics in the LMai index and if a match is found for a New Topic, then it is added to the already existing element/cluster in the index with its Keywords; Thereafter processing to extract the new set of related Keywords to the Topic is carried out.

In still another embodiment of the present invention is, wherein the Metonymy or Relationship list is dynamic and it changes based on the data, therefore Metonymical/Relationship words for a given Topic is incremental.

Figure 10:
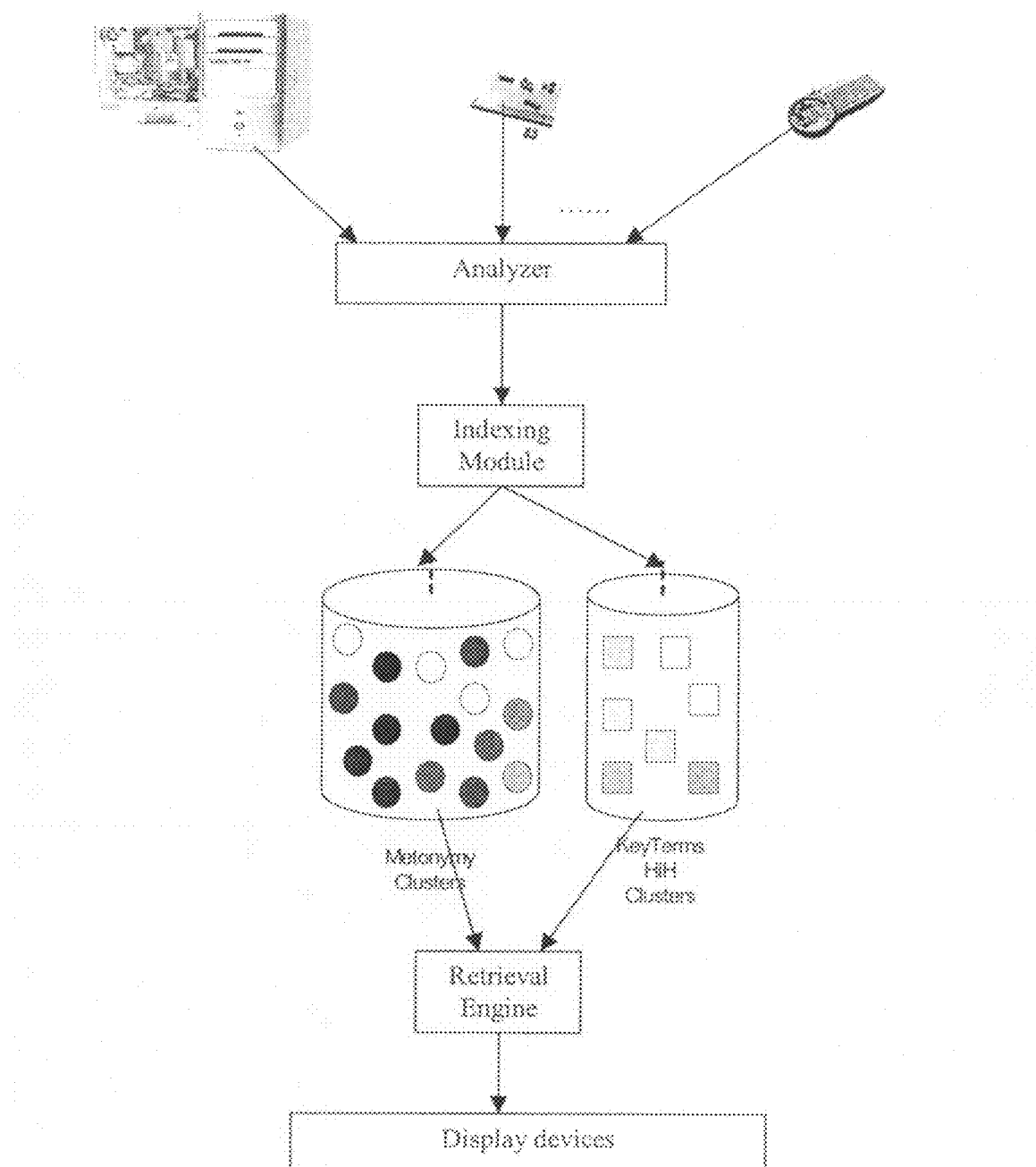
FIG. 10 shows schematic of LMai system.

In still another embodiment of the present invention is a system as shown in FIG. 10 for automatically identifying Keywords, KeyTerms and Topics from a set of documents and thereafter automatically identifying the metonymical/related words by Latent Metonymical Analysis and Indexing (LMai), said system comprising: document input module for providing unstructured data; means for analyzing the document; an indexing module for indexing/clustering Topics and their related words, and also KeyTerm and their HiH terms; retrieval engine to retrieve the context based results from the index/cluster; and display system to display retrieved context based results.

In still another embodiment of the present invention is, wherein the document is an electronic document selected from a group comprising PPT file, DOC file, PDF file or any other predetermined format converted into tokenized format.

In still another embodiment of the present invention is, wherein the system provides for automatically identifying metonymical/related terms from a set of documents in robotics, guidance systems, and decision-making machine and/or search engines.

In still another embodiment of the present invention is, wherein the analyzer is Snb analyzer.

LMai is a novel concept for Advance Machine Learning or Unsupervised Machine Learning Techniques, which uses a mathematical approach to identify the relationship between the words in a set of given documents (Unstructured Data). This approach does not necessarily need training data to make decisions on matching the related words together but actually has the ability to do the classification by itself. All that is needed is to give the algorithm a set of natural documents. The algorithm is elegant enough to classify the relationships automatically without any human guidance during the process. Ex: if documents on animals are fed to the algorithm, after processing the content in the given documents the algorithm creates its own knowledge base, which would depict relationships between the animals. Say if the user types in "Lion" as the keyword, the algorithm would suggest "Animal, Tiger, Cheetah, Leopard, Big Cat" etc. . . have relationship with the word "Lion".

Note: the dictionary meaning of metonymy if defined as "A figure of speech in which one word or phrase is substituted for another with which it is closely associated".

The term metonymy is used within the name of the algorithm, as the algorithm would try to extract words that would be closely associated to each other. Strictly speaking the algorithm does not just extract only the metonymical words but also would extract the words that have some relationship. Hence, in this paper the words "metonymy/related/relationship" are used interchangeably. As in the above example for "Lion" as the Keyword the algorithm would have extracted many terms that are related, some of which are actually the metonymical terms, which are "Animal" and "Big Cat". Both of these words where, "Latent" within the documents. Also, both these words could be used to substitute for the word "Lion". Hence, the term metonymy.

This explains the reason why we call the algorithm as "Latent Metonymical Analysis and Indexing". Analysis and Indexing part would be clear shortly when we discuss about it.

If this algorithm where to be implemented in a robot that has visual abilities, the robot would be able to read through the documents with the help of adjacent video to text software's and understand the relationships between the words. The benefits are obvious . . . the machine can be programmed to act as a guidance system to human. If additional documents are provided the algorithm has the ability to update its knowledge base based on the data in the given documents.

The algorithm would depict the relationships only if enough data or terms relevant to the keyword given by the user is available and also if the link between them is reasonable.

To prove the capabilities of the algorithm a "Proof of Concept" is developed. The LMai algorithm is implemented on a Search Engine to prove the point. There are various features that are derived from the algorithm that help power the search engine abilities to a very great extent.

Process:

High Level LMai Structure, Hypothesis and Technique used by the Algorithm is as follows . . .

Documents portray information, information contained in the documents usually depict certain specific data like Topic and the Words that are significant in the document. Humans read through documents to understand the Topic on which the document is based and the important words that are associated with the Topic. Also, Humans are capable to make good judgment about the document, if it makes sense or if it portrays gibberish data.

If a machine were proficient to gather important information like Topic and the other associated words from the documents, it would be possible for a machine to define or identify relationships between the words or Topics.

LMai is an algorithm, which makes it possible for a machine like a computer to process electronic documents to identify the Topics and the important words that are associated with the document. It must not be misunderstood that the LMai merely identifies Topics from the document name or title but actually defines a proper Topic based on the document content. This is done by primarily identifying the significant words within the document first, and then based on certain rules applied on these significant words or Keywords, Topic is defined to the document by the algorithm.

LMai is also elegant enough to identify documents, which in general do not portray enough information to be able to define a Topic and also identifies documents with gibberish data or data that has no proper meaning. LMai while Indexing eliminates documents of such type.

Although LMai does not offer 100% accuracy but has a decent accuracy in the range of 60% to about 90% approximately.

Note: Electronic document could be a word document, a PPT file, a TXT file, HTML file or a PDF file or any format but it must be converted to a tokenized format before the data is given to the algorithm. As shown in the FIG. 1

Novel Decomposition Technique:

LMai decomposes or filters out term/words from the document to extract the important or significant words known as Keywords. LMai also defines an appropriate Topic to the document. This is achieved by applying a Novel words/term decomposition or words/term elimination technique.

Note that LMai primarily identifies Topic and Keywords within each document as a first step in identifying the relationship between Words/Term.

Figure 2:
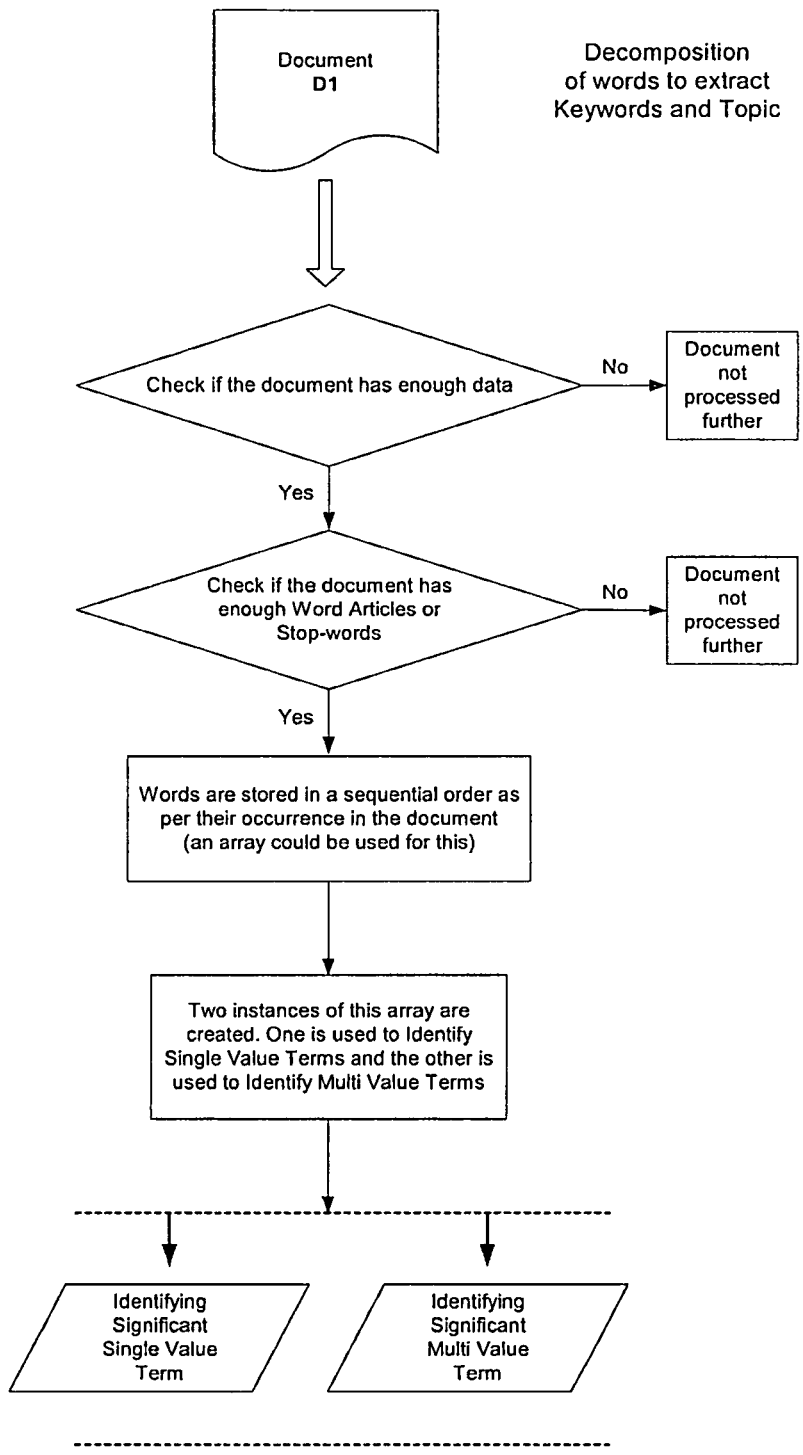
FIG. 2 shows basic steps that are used to ascertain if the documents have enough data before proceeding with the decomposition of terms to extract keywords and topics.

Decomposition of Words to Extract Keywords and Topic:

Before we start the decomposition process, we have to prepare the data for decomposition. First we need to identify significant single value term and multi value term from the document content, which is achieved in two levels:

1. Level 1—Identifying Significant Single Value Term
2. Level 2—Identifying Significant Multi Value Term We have to also ascertain if the document has enough data and if there are enough word articles or stop-words within the document to carry the process further. We call this the Basic Steps. Refer FIG. 2, which describes the Basic Steps . . .

The following are the Basic Steps required:

Step 1—The Tokenized format of any electronic document is provided to the algorithm as an input.

Step 2—Number of words within the document is counted after eliminating special characters and converting all the words to small case letters (if it's a language that has capital and small letters); if the words are very limited say less than 50 words or no words at all then such a document is not processed further to find out the Topic and Keywords as the content within the document is very less to automatically identify an appropriate Topic. If the number of words in the document is more than 50 then all the words are stored in a sequential order as per their occurrence in the document (an assumption is made that the words are stored in some data set, an array could be used for this). Also a count of total number of words is calculated.

Step 3—A comprehensive list of Stop-Words is defined that primarily consists of word articles and words that help sentence formation as given below:

"a", "and", "are", "as", "at", "be", "but", "by", "that", "for", "if", "in", "into", "is", "it", "no", "not", "of", "on", "or", "such", "t", "to", "was", "will", "with", "about", "after", "again", "against", "all", "also", "always", "am", "an", "another", "any", "away", "back", "both", "because", "been", "before", "being", "between", "become", "became", "came", "can", "cannot", "come", "could", "did", "do", "does", "dont", "down", "even", "ever", "every", "for", "from", "get", "give", "go", "going", "got", "had", "has", "have", "he", "her", "here", "him", "himself", "his", "how", "i", "its", "just", "know", "last", "less", "let", "like", "made", "make", "many", "may", "me", "might", "more", "most", "much", "must", "my", "never", "new", "no", "not", "nothing", "name", "names", "now", "oh", "once", "only", "other", "others", "our", "ours", "out", "over", "own", "place", "present", "put", "said", "same", "say", "says", "see", "shall", "she", "should", "since", "so", "some", "still", "such", "something", "take", "tell", "than", "that", "the", "their", "them", "then", "there", "these", "they", "things", "think", "thing", "this", "those", "thought", "through", "too", "under", "until", "up", "upon", "us", "very", "was", "way", "well", "were", "what", "when", "where", "which", "while", "who", "why", "will", "with", "without", "would", "yet", "you", "your" . . .

. . . and many more such term/words and even numbers/special-characters would come in as a part of the Stop-Lister.

Percentage of word articles or the stop words from the Stop-Lister is calculated from the total number of words, if this percentage is less than or equal to 15% then such documents are not processed further as they do not appear to be in a form wherein there is proper sentence formation of the words. This helps us identify junk documents to some extent and documents with words that do not make a sentence, ex: a glossary document. Also, the Stop-words help in identifying documents of other languages apart from English (in this case) and documents that consists of too many words that do not have word articles associated with them. It is observed that most of the documents have about 30% to 40% or more percentage of the word articles, hence Stop-Lister also helps identify any such document that has lesser percentage of Stop-words.

Step 4—If the Step 2 and Step 3 are conceded, then two instances (or two identical copies) of the array "A1" and "A2" in which, all the words are stored in a sequential order as per their occurrence in the document are created. One is used to Identify Single Value Term and the other is used to Identify Significant Multi Value Term.

Figure 3:
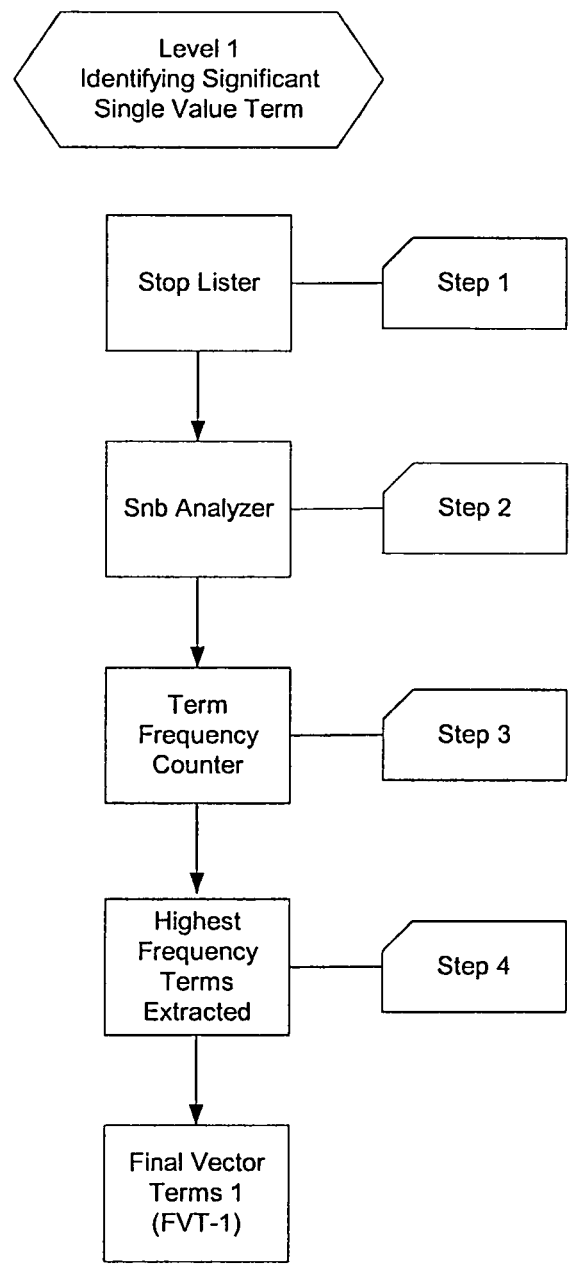
FIG. 3 shows steps to identify significant single value term.

Level 1—Identifying Significant Single Value Term:

The first step in the term decomposition is to identify the significant single value term. Single Value Term in this context would mean words that are separated by space. Ex: "Green Anaconda" although contextually is one word, single value term would evaluate it as two words "Green" as one and "Anaconda" as the other. Identification of Significant Single Value Term is described in the following steps . . . also refer FIG. 3;

Step 1—The first instance of the array (A1) in which the words are stored in a sequential order as per their occurrence in the document is taken and filtered using the Stop-Lister (refer Step 3 of Basic Steps regarding Stop-words/Stop-Lister). Hence, this step ensures that all the word articles or stop-words in the array are eliminated or filtered out leaving behind words that actually depict information in the document. So, now we have in the array only term/words that illustrate the document content.

Step 2—Snb Analyzer is an analyzer that identifies plurals. As an example to understand what this analyzer actually does is, lets take words like—"Requirement", "Requirements", "apple", "apples" etc. . . to be some of the words in the array. The Snb Analyzer would compare these and would give a result like—"Requirements", "Requirements", "apples", "apples" or "Requirement", "Requirement", "apple", "apple", which means it either-appends "s" or eliminates "s" respectively from similar words that differ only with the letter "s" at the end of the word. In our scenario we will eliminate "s", hence the results we get would be "Requirement", "Requirement", "apple", "apple". Hence, we now have an array that has words modified as described.

Note: this is an optional step as the logic to implement this may vary for different languages, but experiments have shown better results if this step is included for English Language. This analysis helps to identify similar words having singular and plural form but since they are derived from the same word it makes sense to modify in the way described above, as it helps in figuring out correct frequencies of the words/term as described in the next step.

Step 3—The Term Frequency Counter processes the words/term in the array to figure out the frequency of each word occurrence. Therefore for the example given in Step 2, Step 3 would depict frequency of words as "Requirement=2", "apple=2". At this stage we have an array with words/term and their respective frequencies/weightages.

Step 4—a. After the frequency of each word occurrence is calculated, the words are sorted in an order to extract the Words with highest frequency.
 b. If the total term/words in the array are more than 15, then the highest first 15 are extracted. A check is made on the 15$^{th}$ term frequency, if it is equal to the next consecutive term frequencies in the array, then even those words/term are extracted.
 c. These words with highest frequencies define "Final Vector Term 1" or "FVT-1". These can go into a new array (FVT-1_Array).

Therefore, the above steps would give us the most significant single value term within the document, which are in the data set FVT-1_Array. These words play a crucial role in the decomposition process and in figuring out the Keywords.

Level 2—Identifying Significant Multi Value Term:

The second step in the term decomposition is to identify the significant multi value term. Multi Value Term in this context would mean words that go together hand-in-hand, they might be separated by space but contextually they represent themselves as one word. Ex: "Green Anaconda" although is made up of two words, multi value term would evaluate it as one word. Other examples of Multi Value Term are "Software Engineering Process", "Requirement Engineering", "Minimally Invasive Heart Surgery" etc. . .

Note: Multi Value Term is made up two or more words that contextually represent as one word. Sometimes, it is seen that a group of 3, 4 or even 5 words together represent as one word but in most scenarios the common hand-in-hand (HiH) term are of range 2, 3 and 4.

This paper covers the decomposition of HiH term of range 2 and 3. However, same principles of decomposition technique can be used for HiH term of range 4 and 5 or higher. Higher the range of HiH term decomposition, the better, but it must be in practical limits of usage.

Note: To identify the HiH term of range 2, 3, 4, . . . a precondition is that there must be at least two occurrences of the HiH words, for example if "Requirement Engineering" has to be identified from the document as a Multi Value Term with HiH range 2 then "Requirement Engineering" must have occurred at least twice in the document else the algorithm would not be able to identify it as a Multi Value Term.

The logic to identify the HiH term is simple.

However, I have hinted the simple logic that one can use as described below . . .

For example if the document content is something like:

***********************************************************************
********************************************* "Custard Apple - Both in tree and in fruit, the custard apple, Annona reticulata L, is generally rated as the mediocre or "ugly duckling" species among the prominent members of this genus. Its descriptive English name has been widely misapplied to other species and to the hybrid ATEMOYA, and it is sometimes erroneously termed "sugar apple", "sweetsop" and, by Spanish-speaking people, "anon...." And more.....
***********************************************************************
*********************************************

Then to identify the HiH2 Term would require taking the first two words and adding them together with a space in between. Therefore the first two words taken from the above document would represent like ("custard"+" "+"apple")→gives us "custard apple", consider this as a First Element.

Now, pick the next set of words, which is ("apple"+" "+"both"), since the word "both" is one of the words from the Stop-Lister "apple both" would not make sense. Therefore, this is not considered for comparison with the first element. We proceed further to identify ("both"+" "+"in"), ("in"+" "+"tree"), ("tree"+" "+"and"), ("in"+" "+"fruit"), ("the"+" "+"custard") . . . as all of these combinations contain words from Stop-Lister these are skipped to the next level, which gives us ("custard"+" "+"apple"), since this combination does not have words from Stop-Lister, it is compared with the First Element, which match.

Therefore "custard apple", is identified as one of the HiH term of range two or HiH2 Term from the document. For every consecutive occurrence of "custard apple" in the document the frequency of such occurrence of "custard apple" is recorded. Also, at every such occurrence the words "custard apple" is replaced by null values (assuming we are using the Array A2).

Hence, the First Element is compared in this way with all the combination until the end of the document. Then the Second Element, which would be "Annona reticulata", is processed in a similar way as the First Element by skipping the null values and words from Stop-Lister until the end of document and so on to extract the other HiH2 Term.

Figure 4:
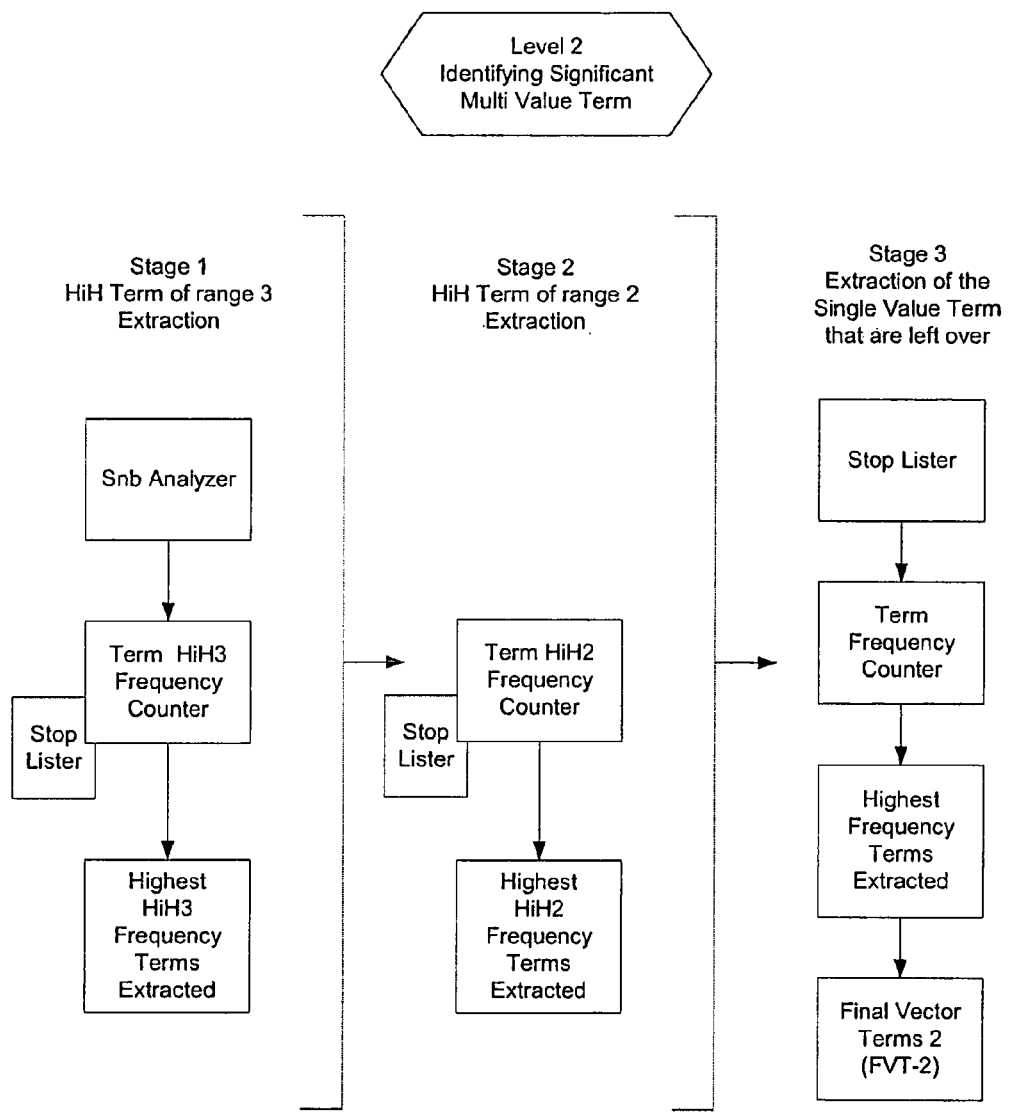
FIG. 4 shows steps to identify significant multi value term.

Note: HiH Term of range 3 or HiH3 are extracted the same way as HiH2 Term but first HiH3 are extracted and then HiH2 Term are extracted from the same document. As shown in FIG. 4

For much better accuracy also consider special characters like ",", ".", "-", ":", ";" . . . etc during the judgment of HiH Term.

Identification of Significant Multi Value Term is described as follows . . .

Stage 1—HiH Term of Range 3 Extraction:

Step 1—The second instance of the array (A2) in which the words are stored in a sequential order as per their occurrence in the document is taken and is parsed using the Snb Analyzer. (The functionality of Snb Analyzer is described earlier in "Step 2 of Level 1").

Step 2—HiH Term of range 3 or HiH3 term are extracted in a separate array (HiH3 Array) and "null" values are marked at their respective occurrences in the array (A2). The frequencies of the HiH3 term are calculated based on their occurrences.

Step 3—a. After the frequency of each HiH3 term occurrence is calculated, the words are sorted in an order to extract the Words with highest frequency.
  b. If the total number of HiH3 term in the array is more than 15, then the highest first 15 are extracted. A check is made on the 15$^{th}$ term frequency, if it is equal to the next consecutive term frequencies in the array, then even those HiH3 term are extracted.

Now, the array (A2) would consist of the words apart from HiH3, word articles and null values (null values were replaced in place of the HiH3 occurrences).

Stage 2—HiH Term of Range 2 Extraction:

Step 1—After HiH3 term are extracted from the array (A2), the same array (A2) is used to extract HiH Term of range 2 or HiH2 term in a separate array (HiH2_Array) again "null" values are marked at their respective occurrences in the array (A2). The frequencies of the HiH2 term are calculated based on their occurrences.

Step 2—a. After the frequency of each HiH2 term occurrence is calculated, the words are sorted in an order to extract the Words with highest frequency.
  b. If the total number of HiH2 term in the array is more than 15, then the highest first 15 are extracted. A check is made on the 15$^{th}$ term frequency, if it is equal to the next consecutive term frequencies in the array, then even those HiH2 term/words are extracted.

Now, the array (A2) would consist of the words apart from HiH3, HiH2 and null values (null values were replaced in place of the HiH3 and HiH2 occurrences in Stage 1 and 2 respectively).

Array (A2) would now consist of null values, word articles or stop-words and words of type Single Value Term.

Stage 3—Extraction of the Single Value Term that are Left Over:

Although, Level 2 concentrates in the extraction of Multi Value Term, the processing of the left over Single Value Term is important as it helps during the decomposition of the term that will be described later. For now, do not misunderstand that Single Value Term extraction at this stage is redundant.

The Array (A2) is now processed to extract Single Value Term by eliminating the word articles and null values.

The steps involved in this stage are similar to the steps described in "Step 1, Step 3, Step 4" of Level 1. Step 2 is not processed as it is already processed in Step 1 of Stage 1 (HiH Term of range 3 Extraction).

The term/words with highest frequencies extracted at this stage define "Final Vector Term 2" or "FVT-2". These can go into a new array (FVT-2__Array).

Note: If we have to extract the HiH Term of range 4 there will be "4 Stages", with the first Stage to extract HiH4 term and next to extract HiH3, HiH2 and Single Value Term FVT-2 respectively in a similar way.

Similarly, HiH Term of range 6, 5 would be carried out with the first stage being the extraction of the maximum hand-in-hand range Term followed by consecutive hand-in-hand range term of lesser dimension.

Summarization of the Processes:

Let us summarize what we have done as a preliminary step for decomposition of term.

Figure 5:
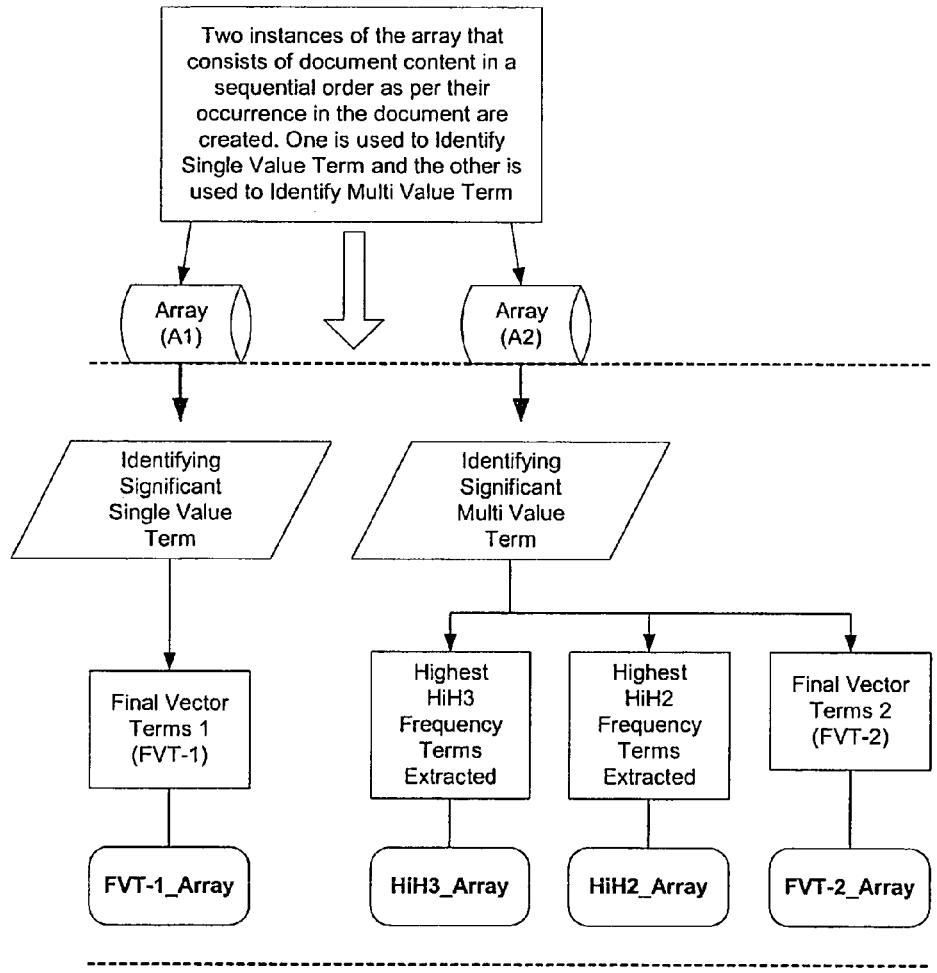
FIG. 5 shows various data sets that are used in term decomposition

1. We followed the Basic Steps as described earlier.
2. Level 1—Identifying Significant Single Value Term
3. Level 2—Identifying Significant Multi Value Term As seen from the FIG. 5 we now have four sets of data—

1. FVT-1_Array—contains the total number of most significant Single Value Term and their Respective Frequencies without the elimination of Multi Value Term.
2. HiH3_Array—contain the total number of most significant HiH3 Multi Value Term and their Respective Frequencies.
3. HiH2_Array—contain the total number of most significant HiH2 Multi Value Term and their Respective Frequencies.
4. FVT-2_Array—contains the total number of most significant Single Value Term and their Respective Frequencies after the elimination of Multi Value Term.

These four data sets play a crucial role in the decomposition process to identify Keywords and Topic of the document being processed.

Term Decomposition:

Let us assume that the document being processed has about 1000 words including word articles. Since, the word articles and any words that are added to the Stop-Lister are filtered, it would reduce the number of words to about 500 approximately. After Level 2, as only the significant term are extracted based on their respective frequency of occurrence there may be about 40 to 50 words approximately residing in HiH3_Array, HiH2_Array and FVT-2_Array.

These 40 to 50 words further need to be decomposed to extract the Best-Term/Words.

The Term Decomposition at this stage is derived from the following Hypothesis that the words in FVT-1_Array are the collection of all the words in the document, which means the Words in HiH3_Array, HiH2_Array and FVT-2_Array would have the words that can be potentially distributed from FVT-1_Array.

Since FVT-1_Array consists of the most significant words in the document, any single or more Words of FVT-1_Array that has its presence in any of the Words present in HiH3_Array, HiH2_Array and FVT-2_Array are considered to be Best-Term/Words.

Hence, based on the mentioned hypothesis Term Decomposition is started.

Step 1: Every HiH3 Term in HiH3_Array is compared with every FVT-1 Term in the FVT-1_Array. Since, every single HiH3 Term is a combination of a 3 words/term. The set of all these 3 words in HiH3 Term are compared with every word in FVT-1_Array. If in case, any of the word in HiH3 Term match any of the FVT-1 term then that HiH3 Term is extracted along with its corresponding frequency of occurrence as one of the Best-Term. Hence, based on this technique, it is seen that if there are about 16 HiH3 Words in the HiH3_Array after decomposition only about 7 HiH3 Words are extracted as the Best-Term/Word and the rest are decomposed.

Step 2: Similarly, the decomposition of HiH2 Term is carried out.

Step 3: FVT-2_Array consists of Single Value Term after the elimination of Multi Value Term; hence, there will be some new set of words in FVT-2_Array that would have occupied the space when compared to the words in FVT-1_Array. FVT-2 words are compared with FVT-1 words and any word in FVT-2_Array that matches any word in FVT-1_Array is extracted along with its corresponding frequency of occurrence to be the Best-Term/Word and the rest are decomposed.

Therefore, the Words in FVT-1_Array play a crucial role in the decomposition of the overall words in HiH3_Array, HiH2_Array and FVT-2_Array.

The above Hypothesis however does not ensure 100% accurate decomposition of Multi Value and Single Value Term to identify the Best-Term/Words or Keywords (from now on we will use Keywords in place of Best-Term/Words) in the document but it is seen that in practical context it is true to a great extent that HiH3, HiH2, FVT-2 words that are extracted as Keywords do contain FVT-1 Words.

The extracted Keywords by the algorithm from the document when examined are of quite a decent quality, which would be near to the quality of Keywords extracted by an average human.

Hence, the term decomposition process helps to enhance the accuracy and to remove unwanted or words with less importance, which means to say that the algorithm is capable to know to a decent extent what term make more sense and what term don't.

We now name our decomposition technique as:

"Single and Multi Value Term Decomposition"
(SMV-TD)

Thus, the Keywords identified in the document by the algorithm now play an important role in defining a Topic to the document.

Identifying the KeyTerms:

Identifying the KeyTerms has an advantage, which we will discuss later.

The following is the way in which KeyTerms are identified . . .

As an example assume that the following are the Keywords extracted from the document by the algorithm:

Note: to identify the KeyTerms we do not need the frequency occurrence of each Keyword, hence the frequency occurrences are not shown in association with the Keywords.

requirement management plan
  requirement management program
  requirement change management
  determining development priority
  traceability item
  requirement management
  development team
  product lifecycle
  target release
  tool environment
  software tool
  stakeholder request
  change request
  project baseline
  feature
  requirement
  project
  document
  release
  baseline
  customer
  Product
  Change
  Team
  Traceability
  Item
  management We consider HiH3 and HiH2 term for extracting the KeyTerms (in case of HiH4, HiH5 we need to consider even those words); hence we would omit the Single Value Keywords from the list, which would give us the following:

requirement management plan
  requirement management program
  requirement change management
  determining development priority
  traceability item
  requirement management
  development team
  product lifecycle
  target release
  tool environment
  software tool
  stakeholder request
  change request
  project baseline Now, we consider the FVT-1_Array; assume it to be the following:

requirement
  management
  feature
  project
  item
  traceability
  change
  document
  team
  release
  plan
  product
  baseline
  request
  tool
  customer
  development We now compare each FVT-1 term with each HiH3 and HiH2 term as we compared in the Step 1 process of Term Decomposition, which was explained earlier.

We see that the following term in HiH3 and HiH2 match FVT-1 term

| | | |
|---|---|---|
| requirement | management | plan |
| requirement | management | X |
| requirement | change | management |
| X | development | X |
| traceability | item | |
| requirement | management | |
| development | team | |
| product | X | |
| X | release | |
| tool | X | |
| X | tool | |
| X | request | |
| change | request | |
| project | baseline | |

From the above table, which depicts the match of FVT-1 term with HiH3 and HiH2, the following is the frequency of occurrence of the words that match with respect to the above table. Note that the words that don't match with FVT-1 term are marked as "X".

| | |
|---|---|
| requirement | 4 |
| management | 4 |
| change | 2 |
| tool | 2 |

| | |
|---|---|
| request | 2 |
| development | 2 |
| team | 1 |
| product | 1 |
| release | 1 |
| traceability | 1 |
| item | 1 |
| project | 1 |
| baseline | 1 |
| plan | 1 |

The Top Frequency Words, which in this case is "requirement" and "management", define the KeyTerms in the document.

The respective HiH3, HiH2 term that have the term "requirement" and "management" are extracted as the HiH term of "requirement" and "management" and stored separately.

HiH for "requirement" KeyTerm would be:

| |
|---|
| requirement management plan |
| requirement management program |
| requirement change management |
| requirement management |

And HiH for "management" KeyTerm would be:

| |
|---|
| requirement management plan |
| requirement management program |
| requirement change management |
| requirement management |

In this case (example) the HiH for both the KeyTerms are the same.

Note: you can also consider "change", "tool", "request" and "development" as KeyTerms but we have to limit at some threshold. Hence, we will consider the Top frequency words to be the KeyTerms.

As you can see one advantage of identifying the KeyTerms is that, it allows us to further decompose the HiH3, HiH2 (Multi Value Term) to another level, which means the Keywords are further decomposed to the HiH values of KeyTerms, which would give us the following:

| | | |
|---|---|---|
| requirement management plan | | |
| requirement management program | | |
| requirement change management | | |
| determining development priority | | |
| traceability item | | requirement management plan |
| requirement management |  | requirement management program |
| development team | | requirement change management |
| product lifecycle | | requirement management |
| target release | | |
| tool environment | | |
| software tool | | |
| stakeholder request | | |
| change request | | |
| project baseline | | |

KeyTerms also help in decomposing the Single Value Term as well, in the given example

| | | | |
|---|---|---|---|
| requirement | 4 | | |
| management | 4 | | |
| change | 2 | | |
| tool | 2 | | requirement |
| request | 2 | | management |
| development | 2 |  | change |
| team | 1 | | tool |
| product | 1 | | request |
| release | 1 | | development |
| traceability | 1 | | |
| item | 1 | | |
| project | 1 | | |
| baseline | 1 | | |
| plan | 1 | | |

Could be considered as next level of Single Value Term decomposition. Here, we extract the Single Value Term with more than one frequency occurrence.

Hence, the Keywords after KeyTerms Decomposition would get modified to

| | |
|---|---|
| requirement management plan | requirement management plan |
| requirement management program | requirement management program |
| requirement change management | requirement change management |
| determining development priority | requirement management |
| requirements management | requirement |
| development team | management |
| product lifecycle | change |
| target release | tool |
| tools environment | request |
| software tool | development |
| traceability item | |
| stakeholder request | |
| change request | |
| project baseline | |
| feature | |
| requirement | |
| project | |
| document | |
| release | |
| baseline | |
| customer | |
| product | |
| change | |
| team | |
| traceability | |
| item | |
| management | |

However, using KeyTerms for the next Level of decomposition has a disadvantage that, many of the significant term from the earlier Keyword list would be decomposed.

Hence, depending upon the application one must limit the usage of KeyTerms Decomposition.

It must be noted that the KeyTerms are Single Value Term that are associated with their respective HiH term.

Important Note: to identify the relationships among the term/words we would be using the Keywords extracted from "Term Decomposition" technique. Hence, we would not use KeyTerms Decomposition.

KeyTerms Decomposition is just mentioned here as another option to decompose the Keywords further for any application that would need this type of decomposition process.

Defining "Topic" to the Document:

SMV-TD technique was able to extract the Keywords from the document automatically without any guidance or training data. Now, these Keywords play a very important role in defining an appropriate Topic to the document.

When we talk about electronic documents, most of the common document formats have a file name and document properties or the Meta data and the content of the document itself.

We will be interested in the File Name and the first few words in the beginning of the document, which generally describe the document type (in most of the cases the first few words in the document cover the name or topic of the document); we call this the Document Header.

Hence, we now concentrate on:
1. The File Name (every electronic document will have to have a file name, whether it is comprised of text or numbers or alphanumeric but there is a file name defined)
2. Document Header or DH (every document would have content in it, note we have already eliminated documents that do not have content or have very less content in the Basic Steps discussed earlier). After filtering the words from the Stop-Lister and after applying the Snb Analyzer in "Level 1", the first 15 words in the beginning define the Document Header. The Document Header could be stored in an array (DH).

File Name Clean Up process:
1. The "*.ext" must be eliminated. Example: a file name, as "Sample.html" has to be modified such that we get only "Sample" and not the extension, which in this case is ".html".
2. Remove any alphanumeric characters from the file name.
3. Since, the content of the document have been parsed through the Snb Analyzer. Parse the file name as well with Snb Analyzer by comparing the term in the file name with the Document Header Term and FVT-1 Term.
4. Single Term Values extracted from the file name could be stored in an array (FN).

Now, we have 3 parameters DH, FN and FVT-1.
Comparison between→DH and FN
FVT-1 and FN
DH and FVT-1
. . . is done to extract the words of type Single Value Term that match.

| Term in Array | Term in Array | Matching Term Array |
|---|---|---|
| DH | FN | ArrayX |
| FVT-1 | FN | ArrayY |
| DH | FVT-1 | ArrayZ |

Now, transfer the term in Array_X, Array_Y and Array_Z into an array "DocDef1". Apply Step 3 of "Level 1" to term in DocDef1, which is the Term Frequency Counter. This will give us the frequency of the each term occurrence.

| Term in Array | Terms in Array | Matching Terms Array | | |
|---|---|---|---|---|
| DH | FN | ArrayX | → | DocDef1 |
| FVT-1 | FN | ArrayY | | |
| DH | FVT-1 | ArrayZ | | |

Similarly, when we apply the same process for HiH3 and HiH2 Term that where extracted as the Best-Term in Term Decomposition, we get . . .

| Term in Array | Terms in Array | Matching Terms Array | | |
|---|---|---|---|---|
| HiH3 | FN | ArrayP | → | DocDef2 |
| HiH2 | FN | ArrayQ | | |
| HiH3 | DH | ArrayR | | |
| HiH2 | DH | ArrayS | | |

Note: comparison of HiH3, HiH2 term with DH and FN is done as per the "logic to identify the HiH term" was explained.

Now, we have DocDef1 and DocDef2, which consists of words that potentially define the Topic of the document, with the difference that DocDef1 consists of words of type Single Value Term and DocDef2, consists of words of type Multi Value Term.

Please note that we are trying to figure out the best possibility to define a Topic to the document based not just on FN but actually we are trying to ratify with combinations of the Keywords extracted from the document that will help us identify appropriate Topic to the document based on the content of the document.

At this stage we compare DocDef1 and DocDef2 as per the process explained in Step 1 of the Term Decomposition process (DocDef1, here would be an analogy to FVT-1).

The Terms that are extracted are checked to see if their frequencies are 3 for HiH3 Term and 2 for HiH2 Term, if this is asserted then the respective HiH3 and HiH2 Term are known to be the Best-Topic candidates. Such term could be stored in an array (BTC).

Now, since we have the Best-Topic candidates we need to identify the Best among the Best (in case there are a more than one Best-Topic candidate).

The Following are Some of the Rules Based on which, an Appropriate Topic is Chosen by the Algorithm:
1. The Best-Topic candidates array or BTC is checked to see, if there is only one such candidate, if it is asserted then that is defined to be the Topic of the document.
2. If there are more than one Best-Topic candidate's in the array BTC then the frequency of each term is calculated based on the matching Significant Single Value Term in the FVT-1_Array. The Best-Topic candidate with the highest frequency is defined to be the Topic of the document. To understand this rule much better, here's an example:

Assume that the following are the Best-Topic Candidates in the array BTC:
 i. Heart Surgery
 ii. Heart Attack
 iii. Heart Failure Cause
These are broken down to Single Value Term such as:
 i. Heart
 ii. Surgery
 iii. Attack
 iv. Failure
 v. Cause
Each of these terms is checked in the FVT-1_Array to determine their respective frequency with respect to the entire document. We get something like
 i. Heart→21
 ii. Surgery→18 iii. Attack→15
iv. Failure→8
v. Cause→5

Note: if FVT-1_Array does have any such term that match with these then the value assigned to that term is 0.

Now, consider adding these frequency values in Best-Topic Candidates as shown:
  i. Heart Surgery→21+18=39
  ii. Heart Attack→21+15=36
  iii. Heart Failure Cause→21+8+5=34

We see, that "Heart Surgery" has the highest frequency among the three and hence it is chosen as the Topic.

If in case, the frequency of two Best-Topic Candidate's are equal then any one is randomly selected.

3. If in case there are no Best-Topic candidate's derived from the comparison of DocDef1 and DocDef2, then the matching words in. FVT-1 and FN are chosen, which means the term in the ArrayY would define the Topic of the document.

| Term in Array | Term in Array | Matching Term Array |
|---|---|---|
| FVT-1 | FN | ArrayY |

Ex: if ArrayY has the term:
  i. Requirement
  ii. Management
  iii. Plan
  ... as the elements then the Topic would be "Requirement Management Plan". The sequences of the words are basically based on the sequence of the word occurrence in the file name.

4. If in case there are no matching terms in ArrayY to determine the Topic then DocDef1 is compared with the words in FVT-1_Array and the match that has the highest frequency in FVT-1_Array is chosen as the Topic of the document.

5. If there is no match found between DocDef1 and FVT-1, then no Topic is defined to the document by the algorithm as the confidence level to justify a Topic is out of the algorithms reach.

If LMai is not able to define a Topic to the document, then such documents are preferably not indexed by the LMai Index.

Note: The rules mentioned above are in the decreasing order (i.e rule 1 and rule 2 are the best confidence levels of the algorithm, then rule 3 and so on) of the confidence level of the algorithm to determine the Topic of the document.

Therefore, for a Given Document D1, the LMai Algorithm has Defined a Topic (T1) to it and has Also Extracted Keywords (K1) from the Document.

Hence, for a Given Set of Documents D1, D2, D3, . . . LMai would Give Respective K1T1, K2T2, K3T3, . . .

Figure 6:
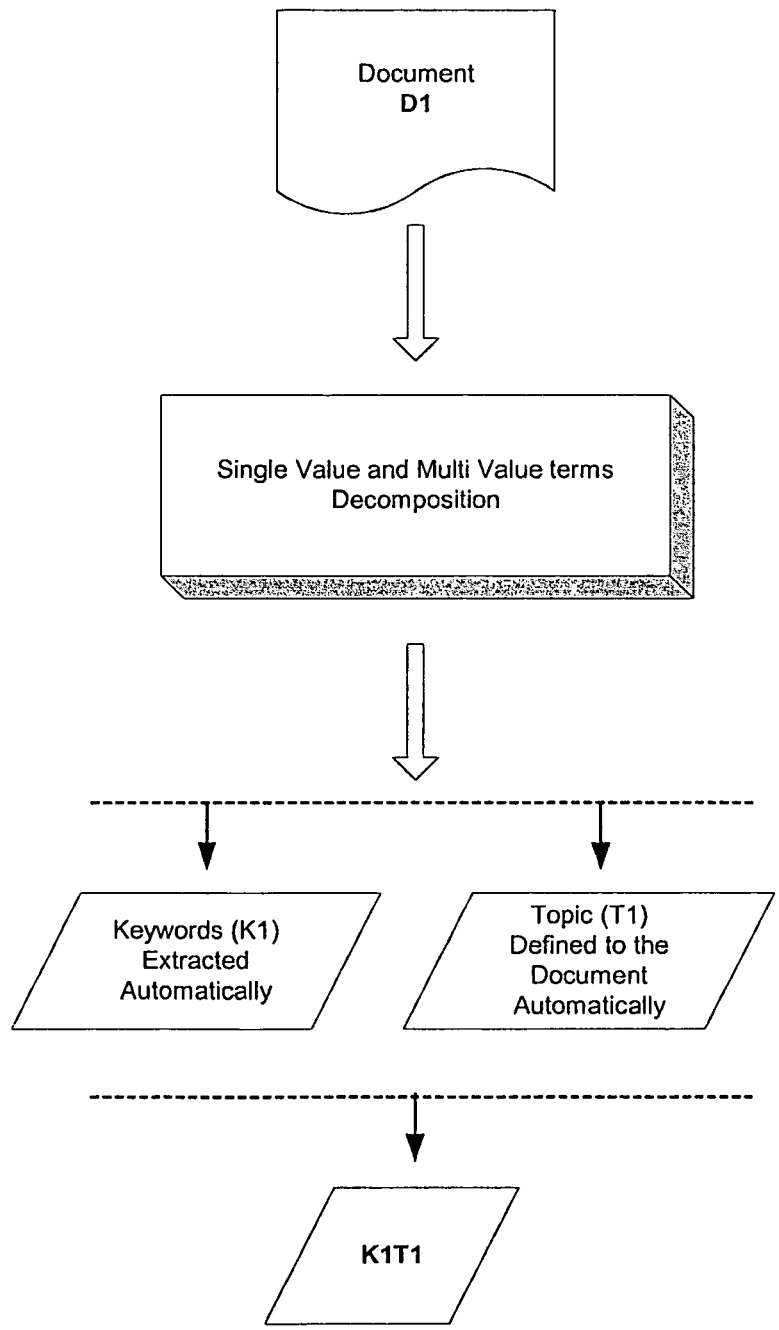
FIG. 6 shows the schematic of LMai extraction of the Topic and Keywords.

FIG. 6 represents the schematic of LMai extraction of the Topic and Keywords.

K1T1, K2T2, K3T3, . . . Kn−1Tn−1, KnTn would help us to identify the relationship between words/term.

Following is the Hypothesis Based on which Relationship Between Topic and Keywords is Identified:

We know that every sensible document would have an appropriate Topic and significant words that explain the Topic, which clearly means that these significant words or Keywords are directly related to the Topic. At this point we try to extract the best keywords, which have occurred more frequently as these would define the relationship with the Topic.

Basic Analysis to Identify Relationships Between Topics and Keywords:

Once, the process of identifying the Topic and Keywords in the document is complete.

LMai uses a mathematical process for analyzing the relationship between the Topics and Keywords.

Assume that there are about 1000 documents that are processed using LMai. LMai would have identified the Topic and Keywords of each document provided all the documents have passed the Basic Steps.

Therefore, we have 1000 Topics and their respective Keywords. An assumption is made that all these Topics and corresponding Keywords are stored in some form (one can use Database, File system etc. . . . ).

The First Level of identifying the Relationships begins with grouping the Topics that are identical (by the word identical we mean if two "Strings" match). For example if we have Topics like . . .

| Topic | Keywords |
|---|---|
| T1 | requirement management plan | K1 |
| T2 | configuration management plan | K2 |
| T3 | process | K3 |
| T4 | test plan | K4 |
| T5 | software development plan | K5 |
| T6 | quality assurance plan | K6 |
| T7 | project management | K7 |
| T8 | requirement management plan | K8 |
| T9 | test plan | K9 |
| T10 | requirement management plan | K10 |
| ... | ... | ... |
| ... | ... | ... |
| ... | ... | ... |
| ... | ... | ... |
| T1000 | ... | K1000 |

K1, K2 . . . etc contain the list of Keywords that were identified during the Term Decomposition.

We begin to group the identical Topics, we see that T1, T8 and T10 Topics are identical as all of them have "requirement management plan" as Topics. Similarly T4 and T9 Topics are identical. We get . . .

| Topic | Keywords |
|---|---|
| requirement management plan | K1 + K8 + K10 |
| configuration management plan | K2 |
| process | K3 |
| test plan | K4 + K9 |
| software development plan | K5 |
| quality assurance plan | K6 |
| project management | K7 |
| ... | ... |
| ... | ... |
| ... | ... |
| ... | ... |
| ... | ... |
| ... | ... |
| ... | ... |
| ... | ... |

Hence, it is evident that we compare the Topics and if they are identical we group them or rather we could say that we add their Keywords.

To understand how Keywords are added assume that the following are the Keywords of T1, T8 and T10:

|    | Topic | Keywords |
|----|-------|----------|
| T1 | requirement management plan | requirement management plan, requirement management organization, requirement management program, configuration management plan, design catalogue document, respective use case, change request, requirement management, use case, stakeholder request, requirement attribute, requirement identification, information system, requirement change, stakeholder requirement, general requirement, requirement traceability, system requirement, customer module, project team, test case, requirement, project, document, stakeholder, management, plan |
| T8 | requirement management plan | use case specification, test plan requirement, unit test case, requirement management plan, use case requirement, test case document, requirement traceability diagram, business system manager, requirement management process, software requirement specification, use case, test requirement, requirement attribute, test plan, requirement artifact, test case, test engineer, project requirement, stakeholder request, requirement change, software requirement, system analyst, project team, special requirement, requirement document, requirement, system, document, test, management, plan |
| T10 | requirement management plan | use case specification, test plan requirement, unit test case, test case document, use case requirement, requirement management plan, requirement traceability diagram, business system manager, requirement management process, software requirement specification, traceability criteria figure, use case, test requirement, requirement attribute, test plan, design requirement, requirement artifact, test case, test engineer, project requirement, stakeholder request, requirement change, software requirement, project team, special requirement, requirement document, design document, requirement, system, document, test, case, management, plan |

To add the Keywords K1, K8 and K10 means to mix these 3 up together we get . . .

TABLE X

| Topic | Frequency | Keywords |
|-------|-----------|----------|
| requirement management plan | 3 | requirement management plan, requirement management organization, requirement management program, configuration management plan, design catalogue document, respective use case, change request, requirement management, use case, stakeholder request, requirement attribute, requirement identification, information system, requirement change, stakeholder requirement, general requirement, requirement traceability, system requirement, customer module, project team, test case, requirement, project, document, stakeholder, management, plan, use case specification, test plan requirement, unit test case, requirement management plan, use case requirement, test case document, requirement traceability diagram, business system manager, requirement management process, software requirement specification, use case, test requirement, requirement attribute, test plan, requirement artifact, test case, test engineer, project requirement, stakeholder request, requirement change, software requirement, system analyst, project team, special requirement, requirement document, requirement, system, document, test, management, plan, use case specification, test plan requirement, unit test case, test case document, use case requirement, requirement management plan, requirement traceability diagram, business system manager, requirement management process, software requirement specification, traceability criteria figure, use case, test requirement, requirement attribute, test plan, design requirement, requirement artifact, test case, test engineer, project requirement, stakeholder request, requirement change, software requirement, project team, special requirement, requirement |

TABLE X-continued

| Topic | Frequency | Keywords |
|---|---|---|
| | | document, design document, requirement, system, document, test, case, management, plan |

Note:
the Frequency column depicts the Frequency of the Topic "requirement management plan"

Now, we apply Step 3 of Level 1, which is the Term Frequency Counter to the collective Keywords of T1, T8 and T10.

We get a list of Keywords with their respective frequencies. We set a threshold percentage limit of say 50% or 70% based on the accuracy desired, any Keyword that has the frequency that crosses this threshold is extracted to be related to the Topic "requirement management plan".

x = 50
If (((Frequency of the Keyword)/(Frequency of Topic))*100 > x) then {
  Keywords with frequencies greater than 50% are identified as related to the Topic
}

Note x is a variable that holds positive value lesser than or equal to 100.

In the example given—Frequency of Topic=3
Frequency of Keyword depends upon the number of occurrence of the Keyword within the set ex: "stakeholder request" keyword frequency is 3
"use case" keyword frequency is 3
"requirement attribute" frequency is 2 and so on . . .
Hence, if we use this formula we get the following list of related words for "requirement management plan". The related words helps us understand the context to which the Topic "requirement management plan" belongs.

| Topic | Related Term |
|---|---|
| requirement management plan | use case |
| | stakeholder request |
| | requirement attribute |
| | project team |
| | requirement change |
| | software requirement |
| | special requirement |
| | requirement document |
| | project requirement |
| | requirement traceability diagram |
| | business system manager |
| | requirement management process |
| | software requirement specification |
| | test requirement |
| | test case |
| | use case specification |
| | test plan requirement |
| | unit test case |
| | use case requirement |
| | test case document |
| | requirement |
| | document |
| | management |
| | plan |
| | system |
| | test |

Note:
in the above list "requirement management plan" Keyword is omitted as a related word, since the Topic and this particular Keyword is same (redundant).

Hence, for given 1000 documents if there are about 400 Topics grouped together (i.e identical topics grouped as explained), then all these 400 Topics would have their related words identified. In other words the algorithm has automatically found the WORDS/TERM that are related to each other without any guidance.

Figure 7:
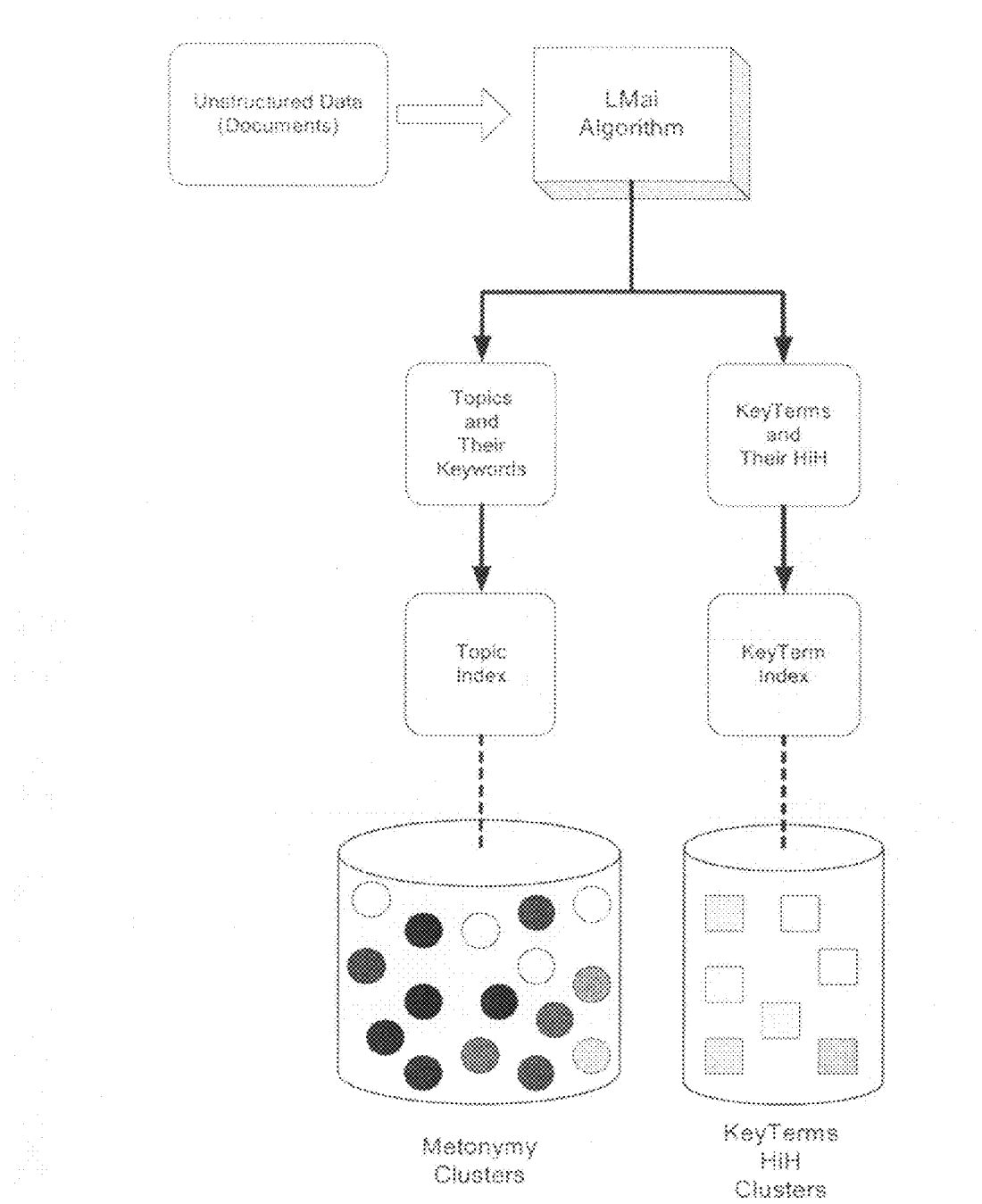
FIG. 7 shows index/clusters used to store topics and their related words using LMai algorithm.

Hence, if an Index is created based on the process to extract the relationships as explained and then if we give Keyword as "requirement management plan", then the algorithm would return the related term that are associated with "requirement management plan". Refer FIG. 7; each cluster represents a Topic and the list of related term (just like the list for "requirement management plan" in the example described earlier)

With this Basic Analysis to identify related term we now move on to the next step of "Analysis and Indexing", which gives us much broader dimension to identify the Related words.

Note: if a set of new documents are added, then the New Topics are compared with the existing Topics and if a match is found for a New Topic, then it is added to the Group with its Keywords. The process of finding the Related words is repeated. Hence, the Metonymy or Relationship list is dynamic and change based on the data. Hence, Metonymy for a given WORD/TERM is incremental.

Below is a representation of the schematic of LMai analysis for relationship mapping or defining Metonymy.

| | K1T1 | K2T2 | K3T3 | . | . | . | KnTn |
|---|---|---|---|---|---|---|---|
| K1T1 | X | X | X | X | X | X | X |
| K2T2 | (K2T2)(K1T1) | X | X | X | X | X | X |
| K3T3 | (K3T3)(K1T1) | (K3T3)(K2T2) | X | X | X | X | X |
| . | . | . | . | X | X | X | X |
| . | . | . | . | . | X | X | X |
| . | . | . | . | . | . | X | X |
| KnTn | (KnTn)(K1T1) | (KnTn)(K2T2) | (KnTn)(K3T3) | . | . | . | X |

For a Given KxTx and KyTy
where x, y values within the range 1 to n
if (Tx ==Ty) => (Kx + Ky)
If (((Frequency of the Keyword)/(Frequency of Topic)) * 100 > x) then
Keyword Freq > x identified as related to the Topic Note:
x is an integer value less than 100.

KeyTerms and their HiH:

While identifying the KeyTerms, it was mentioned that there is an advantage of doing so. If KeyTerms and their HiH term are processed in a similar way as explained for Topics and their respective Keywords, we get the various combinations of HiH term for a given KeyTerms.

Here, we need to treat KeyTerms as a Topic and their respective HiH term as Keywords but a separate Index for KeyTerms must be maintained. KeyTerms must never be mixed with the Topics while Indexing. The only advantage of Indexing KeyTerms is that during retrieval if we give a Keyword as say, for example "Heart", then the word "Heart" could be looked in two Indexes:

1. Topic Index
2. KeyTerms Index

Topic Index would return the list of words related if available for "Heart".

KeyTerms Index would return the HiH term associated with "Heart" like—Heart Surgery, Heart Attack, Heart Failure Cause etc...

These HiH term could now be mixed with Topic Index metonymy list, after removing the redundant term from the list we get an enhanced metonymy list.

One disadvantage is that, since KeyTerms are of type Single Value Term, they could be used only if the Keyword given to find its metonymy term is a Single Value Term, as it is obvious from the above example (if a Multi Value Term like "Asian Lion" is given as a Keyword then there is no point to look into the KeyTerms Index).

Important Note: Experiments have shown that KeyTerms come handy if the data is less (ex: 1000 to 5000 documents) but for a very large data set going over a couple of thousands of documents, the KeyTerms HiH list would be redundant. However, there is no harm in KeyTerms Index usage, as it does not affect the metonymy.

Therefore based on the application one must limit the usage of KeyTerms Index.

Analysis and Indexing:

From the Basic Analysis to identify relationships between Topics that are identical and their respective Keywords, it is clear that Keywords play a vital role to identify the metonymy or words that are related to a Topic.

The question now is that, how do we identify if there is a relationship between the Topics that are not identical.

The solution is based on the relevance of the keyword for which we are trying to extract the metonymical/related topics.

Figure 8:
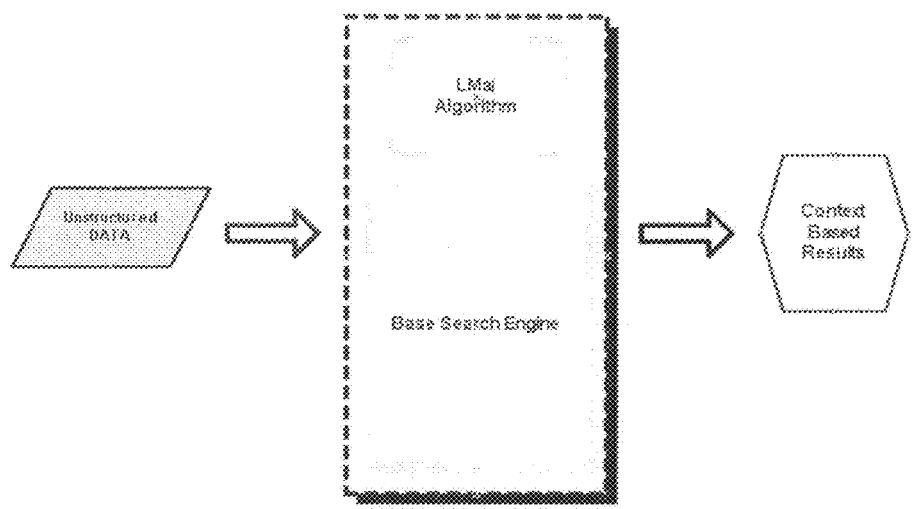

To understand the solution we would plugin the LMai algorithm on top of a Search Engine as shown in FIG. 8.

Note: the Search Engine could be any typical Search Engine that is capable of indexing and retrieving unstructured data with a decent relevance.

The LMai Algorithm is boxed in a way that acts as a plugin to connect any typical Search Engine that is able to Index and retrieve unstructured data. Hence, there are two Indexes maintained, one by the base search engine, which is a typical Index, and a Metonymy/Relationship Index maintained by the Plugin (the LMai algorithm).

Figure 9:
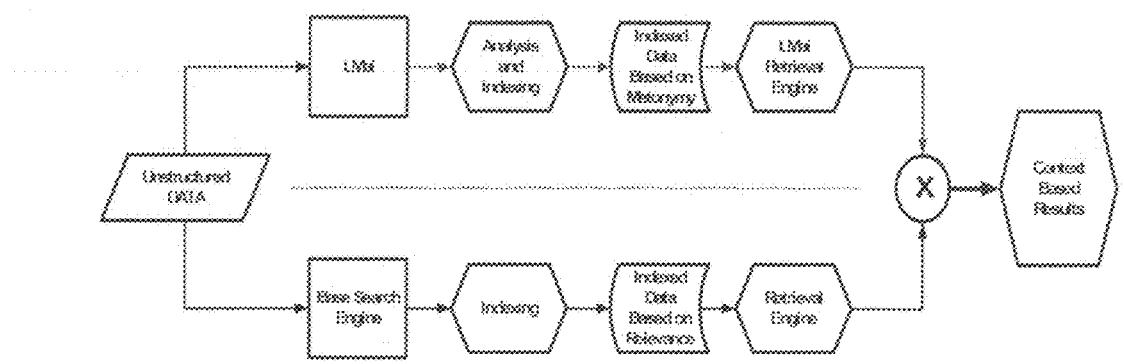
FIG. 9 shows process of indexing and retrieval of the data by both Retrieval Engine and the Base Search Engine for the "Search Keyword" entered by the user.

As seen in FIG. 9 it is clear that LMai maintains its own Index and the Base Search Engine creates its Index. The difference in the Index maintained by LMai is that it maintains an incremental dictionary of "Words" that are related to each other (as explained in Basic Analysis to Identify the relationships between the Topics and Keywords).

During the process of retrieval of the data, both the LMai Retrieval Engine and the Base Search Engine process the "Search Keyword" entered by the user.

The Base Search Engine returns results based on the relevance of the "Search Keyword". The LMai algorithm identifies the cluster (Topic) from its index that matches the "Search Keyword" entered by the user and returns Metonymical/Related term of the "Search Keyword" if there are any (as explained earlier).

In addition to this LMai utilizes the search results returned by the Base Search Engine to identify, if there is a relationship between the Topics in the LMai index that are not identical. The Following is the Way in which it does:

Let us assume that we give the search keyword as "Animal". LMai would first look if "Animal" were one of the Topics in its Topic Index. If it is ascertained that such a Topic exits, then the following are the steps by which LMai identifies the related Topics.

1. For every document indexed by the Base Search Engine, LMai would have also indexed it provided the Basic Steps are through (refer Basic Steps LMai takes to process a document).
2. We know that for every document processed by the LMai algorithm we get the Topic and Keywords of that document.
3. Now, for every document returned by the Base Search Engine as a Search Result, LMai would extract the corresponding Topic of the document from its Index. (One can use the document reference or Doc-ID or whichever method is feasible to extract Topics of corresponding documents)
4. Therefore, if the Base Search Engine returns "Results"={D1, D20, D342, D500, D670, . . . } then, LMai would extract the corresponding Topics={T1, T20, T342, T500, T670, . . . }
5. If the Base Search Engine has found a total of say 10,000 (just an example, could be more or could be less) results for a given search keyword. LMai would extract the Topics of the first 100 documents returned as search results. If the total number of results returned by the Base Search Engine were less than 100 (say for example 45 results returned), then LMai would extract all the 45 Topics.
6. LMai then runs Step 3 of the Level 1, which is the Term Frequency Counter on the extracted Topics.
7. All those Topics that have more than 2 frequency occurrences are extracted as the Topics that are related to the search Keyword provided.

It means, if T1="Lion", T20="Tiger", T342="Camel", T500="Tiger", T670="Lion" . . . etc then Lion and Tiger are chosen as related Topics of the search keyword.

The Process Explained Above is Based on the Following Hypothesis:

The results returned by the base search engine are based on the relevance of the search keyword; it is obvious that all the documents that are returned have an instance of the search keyword. The documents that are most relevant to the search keyword are returned first followed by the documents with lesser dimension of relevance. Hence, the topics of the top results will be related to the search keyword due to the fact that documents having similar contents are related (a document on "Diarrhea", would most probably have a mention of "Dehydration", hence when you search for "Dehydration" the document on "Diarrhea" is also returned as a result). Since, the Topic of the document content is known based on the LMai process of identifying the Topic. The Topic's of the documents returned as search results are known and these would have some relationship with each other. At this point we try to extract the best Topics, which have occurred more frequently.

Note: by the term relevance of the base search engine we mean the relevance criteria based on which the results are returned, which could be based on PageRank, Number of Hits or any such thing.

Hints to "Tweak" the Parameters:

During the process of extracting the related Topics as explained in the points above, some tweaking could be done to achieve better accuracy, the following are some of the tips:

1. Every Topic extracted has an associated Frequency (refer Table X in Basic Analysis to Identify Relationships between Topics and Keywords). Once we ascertain that a Topic for the search keyword exits in the Topic Index, ascertain if the Frequency of such a Topic in the Topic Index is above certain threshold (example: greater than 3) and only then proceed with the rest of the steps. This kind of usage has shown greater consistency.
2. Since, we ascertain that a Topic for the search keyword exits in the Topic Index and only then proceed ahead with the rest of the steps. Therefore in this case if the Topic is not found then extracting the related Topics is void. At this point the KeyTerms Index comes handy but is limited to usage only when the search keyword is of type single value term. The search keyword is looked into KeyTerms Index and if found, its respective HiH term are extracted as related.

I hope it is clear now the way in which the relationship between Topics in the LMai index that are not identical is defined using the relevance of the results returned by the base search engine.

It is evident that the usage of base search engine is primarily to act as a keyword relevance engine that returns most relevant results (documents) for a given keyword. Therefore, based on the documents returned LMai manipulates the related Topics automatically.

It is evident that the metonymical/related term/topics extracted based on the relevance of the base search engine is dynamic and might change based on the new set of results returned for the same search keyword in future.

Now, we add the earlier extracted metonymical/related term based on Keywords from the Topic Index with the newly identified set of metonymical/related term based on the relevance of the base search engine for a given search keyword. After removing the redundancies we get an enhanced list of metonymical/related term.

I believe that by now one would have understood the basic logic based on which LMai works.

Since, we have used search engine as a keyword relevance engine to extract the metonymical/related words. Let us understand the various enhanced features a typical search engine can derive by using LMai as a part of its core Indexing and Retrieval process.

How does LMai Enhance the Features of the Base Search Engine?

The LMai algorithm analyzes and combines the result set of the Base Search Engine with the "Metonymical" term in a way that gives "Context Based Results".

Working:

To summarize, the revolutionary Algorithm is capable of parsing through the documents (that get Indexed) to identify the "Topic" on which the document is based automatically with a very decent accuracy as defined earlier. The algorithm also extracts the keywords from the document automatically. It then analyzes the Topics and Keywords extracted from a set of given documents to map the Metonymy (i.e. the relationships between the Topics that are contextually similar are mapped). This makes it possible to make a very powerful information retrieval engine, which not only throws results based on the "Search Keyword" entered by the user but also would display "Topics" that are contextually related to the Search Keyword in sections like "Search Within Topic" and "Search Related Topics".

"Search Within Topic" would have the words that go Hand-in-Hand with the Search Keyword. For example, if the search Keyword is say "Tiger" and if the metonymical/related words identified are like "Bengal Tiger", "Siberian Tiger", "Tiger Beetle", "Tiger Shark", "Tiger Salamander", "Lion", "Big Cat", "Cheetah", "Leopard" etc. . . then "Bengal Tiger", "Siberian Tiger", "Tiger Beetle", "Tiger Shark", "Tiger Salamander" would be listed under the heading "Search Within Topic" as these HiH terms have Tiger in them.

Where as "Lion", "Big Cat", "Cheetah", "Leopard" would be listed under the heading "Search Related Topics".

This gives the user an understanding about the context to which the Search Keyword "Tiger" belongs and also would give an option to search the identified metonymical/related words, so that the user can either narrow down his/her search or expand the search.

Apart from this, there is yet another strong feature that is derived from the algorithm. We know that when LMai processes the documents Topic and Keywords of the corresponding document are extracted. While LMai is indexing these it creates clusters of identical Topics. Now, when the clusters of identical Topics are created, respective document references is also stored.

Let us assume that in about 1000 documents, 3 documents have a Topic "African Lion". Since, these 3 documents have identical Topic they are grouped in one cluster. Also, the document reference of all the 3 documents is stored within that cluster.

When the user gives a search Keyword "African Lion", LMai finds such a Topic as it has created a cluster for such a Topic. LMai would return the references of all the 3 documents that have this Topic. Based on these references LMai returns 3 results wherein the documents portray precise information about what the user is looking for and these 3 results can be termed as "Best Results".

Hence, the Algorithm finds the result set where the search query or keyword matches the Topic in a section known as "Best Results".

The Best Results are listed on the Top. Following the Best Results would be the results that are returned by the Base Search Engine. To avoid duplication of results a comparison is done to exclude those results that are already displayed as Best Results.

However, Best Results section appears only when a Topic of the corresponding search Keyword entered by the user exists in LMai Index.

Therefore, LMai adds value to the overall result set improving the efficiency of the Search.

Since, LMai tries to identify Topic and Keywords of every document, these could be effectively used while displaying the result set. The following is the way in which the Results could be displayed:

Results:

The result set displayed by any typical search engine would portray the link and short summary of the content within that link in the result page. LMai offers a Novel Technique that helps the user justify the link to select in the results displayed. The following is the way in which the result set is displayed:

1. The link—a click on which would take the user to the content page.
2. "Related to"—Topic identified by LMai is portrayed (optional).
3. "Information about"—few of the significant "Keywords" extracted by the algorithm are displayed that helps the user to understand the content within the link without having to visit the page. The Keywords information help the user to select the right link that matches the content they are looking for without having to traverse back and forth otherwise. No search engine to our knowledge offers this technique, which makes it very unique and powerful.

Thus, the end users would gain additional pertinent information that might not have been originally conceived, thus offering an expert search. In short, the Algorithm portrays the capabilities to power the "Next Generation Search Engine".

Now, we know how LMai as shown in FIG. 10 enhances the features of the Base Search Engine!

Note: as explained earlier the Algorithm is elegant enough to name a document with appropriate Topic only if it is quite confident and not otherwise, also the Metonymical/Related words for the given search keyword are shown provided there is enough data on the subject and also depends on the confidence level of the algorithm, which means the Algorithm seldom shows results that are not contextually similar.

Other Potential Features:

The other potential features that could be derived from LMai are as follows:

1. Guidance to Machine—

In organizations, we know that there are huge sets of documents that are collated over a period of time. These documents could be used to extract "Knowledge" and hence, are crucial in Knowledge Management Systems. The general problem faced however by every organization is to classify the existing knowledge in a usable form, which includes to identify only those documents that actually depict useful information and filter out the rest of the documents that are stale. To accomplish this organizations use knowledge experts who manually classify the information, which is time consuming and quite expensive.

Therefore we understand that classifying the information becomes a crucial part in knowledge management systems. LMai could be used to solve the problem in the following way.

We have learnt how LMai has the self-learning abilities or unsupervised learning abilities. We will now try to understand how LMai could be used with guidance data.

We know that every organization has its business/functional vocabulary that gets reflected in the documents of that organization, we call this "Organization Vocabulary".

If Guidance to Machine is provided, what we mean here is that if we provide the "Organization Vocabulary" to LMai, LMai will use the guidance data to classify the information appropriately.

Hence, to classify the documents as per the needs of the organization, "Organization Vocabulary" (OV) is provided to LMai. A simple example to understand OV is as described

| | | Organizational Vocabulary - Keywords | | | |
|---|---|---|---|---|---|
| | | Department | | | |
| Projects | Development (Sub-Category) | Project Management (Sub-Category) | Configuration Management (Sub-Category) | Requirments (Sub-Category) | ... ... ... |
| Projects | Development | Project Management | Configuration Management | Requirements | |
| | Coding | Metrics Maintenance | BLA | System Analysis | |
| | Unit Testing | Weekly Review Meetings | Baseline Audit | Requirements Analysis | |
| | Unit Test cases | project baselines | CSA | Change Request | |
| | Release Notes | budget control plan | Configuration Status Accounting | Change Control Board | |
| | coding workflow | schedule control plan | VSS | traceability item | |
| | development server | Process Workshop | CVS | Functional Requirements | |
| | — | Deviation | Configuration Change Management | supplementary requirements | |
| | — | Configuration Management Plan | configuration audits | Requisite Pro | |

-continued

Organizational Vocabulary - Keywords

| | | Department | | | |
|---|---|---|---|---|---|
| Projects | Development (Sub-Category) | Project Management (Sub-Category) | Configuration Management (Sub-Category) | Requirments (Sub-Category) | ... ... ... |
| | — | Microsoft Product Plan | — | Requirements Change Management | |
| | — | MPP | — | — | |
| | — | Plan | — | — | |
| | — | Project Plan | — | — | |
| | — | — | — | — | |
| | — | — | — | — | |

We understand from the above table that OV is nothing but significant words (Keywords) used in a specific department within the organization. The table above depicts an example for OV related to Projects; such OV's could be constructed for other departments within that organization. Anyway, once such OV is built, it is given to LMai.

LMai uses the OV in the following way:

a. We know that LMai extracts Keywords and Topic for a given electronic document.

b. For every document processed by LMai, LMai extracts the Keywords and its Topic.

c. The Topic and Keywords extracted by LMai are compared with the OV.

d. If the Keywords match, then it understood that the document processed belongs to the category "Projects" (as per the table above).

e. Within each category LMai is able to classify the sub-categories as well, which will be based on the percentage of the content that belongs to a sub-category.

Let us assume for a given document the following is the Topic and Keywords extracted by LMai:

| Topic | Related Term |
|---|---|
| requirement management plan | requirements management plan \| 11 |
| | requirements management program \| 2 |
| | requirements change management \| 2 |
| | determining development priority \| 2 |
| | traceability item \| 9 |
| | requirements management \| 5 |
| | development team \| 4 |
| | product lifecycle \| 3 |
| | target release \| 3 |
| | tools environment \| 2 |
| | software tools \| 2 |
| | stakeholder requests \| 2 |
| | change requests \| 2 |
| | project baselines \| 2 |
| | features \| 21 |
| | requirements \| 15 |
| | projects \| 14 |
| | documents \| 12 |
| | release \| 8 |
| | baselines \| 8 |
| | customers \| 8 |

-continued

| Topic | Related Term |
|---|---|
| | product \| 7 |
| | changes \| 6 |
| | teams \| 6 |

Note that the numbers beside the Keywords are actually their frequency of occurrence within the document processed by LMai. We now add up the frequencies, which is considered as the "Total Weightages" or TW.

Now, compare these keywords with the OV and add-up the frequencies of the keywords that match the OV. The frequency obtained is considered as "OV_Match_Frequency" or OVMF.

(OVMF/TW)*100 give us the identified accuracy percentage, which could be used as a condition while classifying (ex: any document that exceeds certain percentage is accepted to belong to the category "Projects" else rejected).

For a given document to LMai, the report LMai generates is something like:

```
*************************************************************
               -THE DOCUMENT DEPICTS INFORMATION ABOUT-
---------------------------------------------------------------
   1. CONFIGURATION MANAGEMENT PLAN
   IDENTIFIED KEYWORDS: Projects, Configuration Management Plan,
   Configuration Management, Configuration Status Accounting, VSS,
   Configuration Manager, configuration, software configuration management,
   Configuration Change Management, configuration audits, Change Request,
   Change Control Board, change control, change request document, defect
   reports,
---------------------------------------------------------------
                       -ONTOLOGY MAPPING-
---------------------------------------------------------------
   THIS FILE BELONGS TO THE CATEGORY: PROJECTS
   RECOGNIZED ACCURACY: 80%
   THE SUB-CATEGORIES ARE:
      PROJECT MANAGEMENT = 9%
      CONFIGURATION MANAGEMENT = 58%
      REQUIREMENTS = 25%
      TESTING = 8%
*************************************************************
```

We can see that the Topic identified is "Configuration Management Plan". The identified Keywords are listed. Ontology Mapping is the classification the algorithm does, here we see that the given document belongs to "Category" Projects, with an Identified or Recognized accuracy of 80% (calculated based on the formula (OVMF/TW)*100).

Further, LMai depicts the sub-category percentages, which is based on the following formula:

Sub-category total or $ST=TW-$(total frequency of the keywords that match the keywords of a particular sub-category in the OV).

Sub-category percentage=((total frequency of the keywords that match the keywords of a particular sub-category in the OV)/$ST$)*100

Assume the keywords that match the "Project Management" sub-category keywords in the OV are the following:

Project Management | 12
Metrics Maintenance | 10
Weekly Review Meetings | 5
project baselines | 4

Here, the total frequency of the keywords that match the keywords of "Project Management" sub-category in the OV is 31

If the TW=175, then ST=TW−31, which gives ST=175−31. Therefore ST=144.

Now, Sub-category percentage=(31/144)*100, which is 21.5%.

Hope, this clarifies how to identify the percentages of the sub-categories. The percentage of the sub-category plays a crucial role to further classify the document. In the above report generated by LMai we see that "configuration management" sub-category has the highest percentage of document content, which is 58%. Therefore this specific document is generally classified as a Project document, under Project department, it is further classified as a document that belongs to "configuration management" sub-category.

This explains how LMai classifies the data based on Guidance to Machine. This solves the problem of experts categorizing the documents manually in a Knowledge Management System.

Note: the Knowledge Management System is used as an example. However, LMai could be used with Guidance to Machine in whichever application that requires this type of functionality.

Tip: for better classification, ascertain if about 3 or 4 Keywords in the document match the OV and only then proceed with the rest of the process.

2. Miscellaneous

Personalized Search Profile Creation:

There could be various other applications, which LMai could add value to. Some of them hinted here are as follows (note, the description given here is abstract or just an idea).

We know that every user have their own requirement of search. Their search interests are specific. So every time the user logs on to search he/she would be looking to search for his/her interests.

Using LMai the search engine could be made elegant enough to understand each user needs and return results based on the interests each of the users.

This is possible if LMai can create profile of users interests automatically. Therefore, the idea is that whenever the user logs to search, after certain phase (based on the usage of the search engine) the search engine gets to know the users interests. Once, enough data about a specific user interest is collated, LMai could help the base search engine return the results based on his/her interest.

For every search performed by a user a record is maintained to identify the various links the user visited and the corresponding related term that were highlighted under the sections "Search Within Topic" and "Search Related Topic" are considered. Once, the data gathered is sufficient (a threshold could be set, ex: 25 searches made by the user). The related term and the "keywords and topics" of the visited results are combined together and the Term Frequency Counter is applied. The Topic's with highest frequencies define the users interest based on which his/her profile is created automatically. The profile is updated dynamically based on the consecutive searches performed by the user.

Once, the profile is created it could be used as one of the relevance criteria while retrieving the search results.

Using LMai in Robots or Humanoids:

If a robot has visual abilities, which means the robot could read a document (whether a physical document or an electronic document on the internet). Assume that the robot scans through the document using the visual artifact. The scanned document is converted to "text" using the already available technology in scanners or some other technology.

Now, consider that LMai is implemented within the robot. LMai could use the converted text information to process and identify relationships between various words (if hundreds of such documents are read by the robot). Assume the robot has read documents about "Medical Science". Also, assume the robot is equipped with speech technology, which means the robot can listen to user commands and reply back appropriately (such technology is already available). If the user speaks to the robot and enquires about the Topic—"Diarrhea", the robot passes the keyword "Diarrhea" to LMai. LMai finds if such a Topic exits in its Index, if so the related/metonymical words are returned. The robot uses these related words and could reply back to the user by saying "Diarrhea" is related to "Dehydration", "*Coli* Enteritis", "Bacterial Gastroenteritis", "*Campylobacter* Enteritis" etc, the robot could also narrow down the information on "Diarrhea" by asking the user if he/she needs information specific to "Diarrhea" like "Induced Diarrhea", "Diarrhea Prevention", "Diarrhea Diet" etc. . .

This helps in getting guidance from a machine, in any area that requires this kind of functionality. If not in a robot at least it could be used in application software's that need this feature.

A Note on Document Quality and Best Working Parameters:

The accuracy of LMai is quite decent for a given document in general. Even in the context of indexing and processing the documents on the web, which have advertisements on them, LMai still is capable of getting a decent accuracy in the range of 60% to 90%. But for documents that do not have noise in them and only depict information on a given Subject/Topic, the accuracy of LMai is more than 90% with a good consistency.

For documents that approximately have about 1000 to 6000 words in them, the parameters that are marked in RED in this document are known to be the best parameters based on the experiments conducted. However, for the documents that have enormous number of words, these parameters could be correspondingly tweaked. For example, given a document with about 2000 words LMai would identify about 30 Keywords from it but if the document content is huge say about 100,000 words then the parameters must be increased to a value as per the need.

However, experiment results have shown that LMai's capability to extract Topic and Keyword for a given document with huge data to be consistent for even the parameters marked in RED. Hence, I consider the parameters marked in RED to be the Best Working Parameters but not necessarily restricted to only these values.

Advantages:
- Identifies the "Document Content" and provides information on the type of document it is (basically provides a relevant "Topic" even though the file name or title is not appropriate).
- Identifies the "Keywords" from the document automatically (it does not need any training data to identify the keywords as it is the case with most of the Neural Net algorithms)
- LMai uses a novel term decomposition technique by virtue of which identification of Keywords and Topics is realized.
- If "Guidance to Machine" (which defines Organizational Vocabulary) is provided to the algorithm, it categories the documents precisely. Guidance to Machine portrays a set of commonly used words/term in the department of an organization. This is required if the organization wants to categorize the documents as per their process.
- The algorithm would have the ability to automatically categorize the documents and map the related ontology's based on Topic co-occurrences, even if Guidance to Machine is not provided.
- The algorithm, is not language specific, which means it can process documents written in any language as long it can be tokenized. The only thing needed would be defining a comprehensive Stop-Lister (Stop-words) for that Language.
- Personalized search is another powerful feature that could be derived from the Algorithm.
- LMai connects as a plugin with any typical search engine that is capable of searching through unstructured data, hence LMai helps add context based search feature to existing search engines.
- Context Based Search is supposed to be the future of the next generation search engines, where in the user would look for information on a certain thing and the search engine would be intelligent enough to return results what the user is looking for and would also display related information as described in examples previously.
- The related information to the search keyword is divided into "Search Within Topic" and "Search Related Topics". "Search Within Topic" depicts additional information within the context of the search keyword. "Search Related Topics" depicts additional information related to the context of the search keyword. This helps to a very great extent in finding the information the user is looking for.
- LMai could be used to create an intelligent desktop search tool, wherein a search result is displayed with related items that have a relationship with it.
- LMai could be used to make an Intelligent Knowledge Management tool, as it would not need cumbersome workflow and domain experts to categorize the documents.
- In the context of web, the web-crawler would act as a feed to the LMai algorithm, the algorithm categories the information automatically and the data gets indexed, hence during a search if the user searches for a Topic "Siberian Tiger" the system would throw up information that exactly matches "Siberian Tiger" and the agents that have a relationship with "Siberian Tiger", hence the system in this case would display "African Lion, Leopard, Big Cat etc. . . ." in the result set as a related Topic, which makes retrieval very efficient.

Proof of Concept (PoC):

The PoC is a working prototype that portrays the potential capabilities of the algorithm. The perspective of the PoC being developed is to achieve a patent and target the "Search" market on the web dominated by Google, Yahoo, MSN, ask.com etc. . . The scope of the PoC is primarily for demonstrating the potential capabilities of the Algorithm. Hence, this exercise must not be mistaken as a complete deployable commercial "Intelligent Search Engine".

I claim:

1. A computer-implemented method for advance and/or unsupervised machine learning by Latent Metonymical Analysis and Indexing (LMai), said method comprising steps of:
  a. inputting natural documents;
  b. eliminating special characters to count a number of words within the given document, filtering the contents of the document based on a list of predefined stop-words and calculating a fraction of the stop-words present in the document;
  c. determining a Significant Single Value Term data set and a Significant Multi Value Term data set from the document;
  d. decomposing words in the Significant Single Value Term data set and the Significant Multi Value Term data set to extract Keywords of the document being processed;
  e. optionally, determining KeyTerms and their respective hand-in-hand (HiH) words automatically for further decomposition, wherein the hand-in-hand (HiH) words are words that go together as one word;
  f. identifying a Topic in an unsupervised manner based not just on a File Name but also by manipulating/comparing with various combinations of document attributes that are extracted to select Best Topic candidates and thereafter defining an appropriate Topic based on predefined rules using a computer; and
  g. analyzing relationship between the identified Topics and the Keywords and thereafter indexing the Topics and their related Keywords, KeyTerms and their respective hand-in-hand terms into a Metonymy cluster and a KeyTerms HiH cluster respectively.

2. The computer-implemented method as claimed in claim 1, wherein the method uses a self-learning process to make decision in identifying the relationship between the words in natural documents in any electronic file format converted into a tokenized format before data is given to the method to perform the classification of relationship between the related words without any human guidance by virtue of defining an appropriate Topic for a given document based on its content.

3. The computer-implemented method as claimed in claim 1, wherein the method identifies the documents with gibberish data or documents having stop-words less than or equal to a predetermined percentage, preferably 15%, which are not processed further to identify Keywords and Topics or data having no proper meaning to be eliminated during indexing.

4. The computer-implemented method as claimed in claim 1, wherein the method is designed to act as a plug-in to connect to any typical search engine, which indexes and retrieves unstructured data and analyzes and combines result set of the search engine preferably base search engine with the metonymical terms to obtain context-based results and returns results for a given search keyword that match the Topic in LMai index along with the results returned by the base search engine and suggests the related Topics that match the search Keyword in separate sections in order to search within the Topic or to search related Topics and displays the Keywords of results returned in order for the user to select the appropriate link that matches the content they are looking for without having to traverse back and forth otherwise and wherein the metonymy or relationship index created by the method is incremental and dynamic based on new addition of data.

5. The computer-implemented method as claimed in claim 1 is capable of processing the documents written in any language which is tokenized and wherein documents having stop-words less than or equal to a predetermined percentage is used to filter out or skip the documents of other languages.

6. The computer-implemented method as claimed in claim 1, wherein the method provides for advance and/or unsupervised machine learning in robots, guidance systems, knowledge management systems, decision making machines and/or search engines.

7. The computer-implemented method as claimed in claim 1, wherein the method automatically creates a personalized search profile based on the user's interest by maintaining previous search information includes but is not limited to various links the user visited and corresponding related Topics that are extracted upon each search, thereafter the profile is updated dynamically based on consecutive searches performed by the user.

8. The computer-implemented method as claimed in claim 1, wherein the method classifies the documents precisely without the intervention of experts during the process using trained data and/or guidance to machine and depicts the percentage accuracy determined during classification and the percentage of content related to each of the sub-categories for ontology mapping.

9. The computer-implemented method as claimed in claim 1, said method further comprising steps of:
  a. checking the document being processed to identify a prerequisite minimal size of data and/or word articles/ words;
  b. storing the data or words in the document in a sequential order as per their occurrence in the document;
  c. creating two identical instances of the data to facilitate the identification of the Significant Single Value Term data set and the Significant Multi Value Term data set;
  d. determining a Significant Single Value Term from one of the instance of the data set and a Significant Multi Value Term from the other instance of the data set starting from the highest hand-in-hand words range predefined, followed by consecutive hand-in-hand range terms of lesser dimension;
  e. storing the identified Significant Single Value Term and the identified Significant Multi Value Term of different hand-in-hand range in their respective data sets;
  f. comparing words in the Significant Multi Value Term data set with the words in the Significant Single Value Term data set to extract those words in the respective hand-in-hand range of each Significant Multi Value Term data set as Best-Terms, which have at least one instance of Single Value Terms within their range and the rest of the hand-in-hand terms are decomposed; and
  g. comparing the data sets in such a way that every individual hand-in-hand range term that has at least one instance of any term in the Significant Single Value Term data set that is extracted as a Keyword and the rest are decomposed to determine the KeyTerms.

10. The computer-implemented method as claimed in claim 9, wherein the method automatically extracts the Keywords and the KeyTerms from the electronic documents without any guidance or training data given to the said method and extracted words and terms are stored in two data sets, which are the Significant Single Value Term data set and the Significant Multi Value Term data set each having the same instance of data that has the words stored in sequential order as per their occurrence in the document in order to decompose the words to identify the Keywords in the document processed.

11. The computer-implemented method as claimed in claim 9, wherein the Significant Multi Value Term data set has its own predefined set of hand-in-hand range dimensions and wherein the extraction of the Significant Multi Value Term data set is carried out with a first stage being the extraction of the maximum hand-in-hand dimensional range followed by consecutive hand-in-hand range words of lesser dimension and optionally the KeyTerms are used for further decomposition of the Keywords.

12. The computer-implemented method as claimed in claim 9, wherein the method for identifying the Significant Single Value Term data set from the given document comprises steps of:
  a. retrieving words from the data set stored in sequential order as per their occurrences in the document;
  b. eliminating special characters and/or word articles/ words in the document by comparing with a list of predefined stop-words in order to obtain informative words in the document;
  c. processing the informative words to determine the frequency of each word occurrence; and
  d. sorting the processed words in order to extract a predefined number of words with a highest frequency to identify the Significant Single Value Term.

13. The computer-implemented method as claimed in claim 9, wherein the method for identifying the Significant Multi Value Term data set from the given document comprises steps of:
  a. retrieving words from the data set stored in sequential order as per their occurrences in the document;
  b. extracting hand-in-hand words of a predetermined range into appropriate data sets from retrieved words, thereafter extracting words of type Single Value Term that are left over by eliminating stop-words into a different data set;
  c. processing the extracted words in each of the respective data sets to determine frequency of each word occurrence; and
  d. sorting the processed words in order to extract a predefined number of words with highest frequency in each of the respective data set to identify Significant Multi Value Term data sets of various predefined hand-in-hand range dimensions; and another data set with words of type Single Value Term, which is the residue after Significant Multi Value Term extraction.

14. The computer-implemented method as claimed in claim 13, wherein the range of hand-in-hand words have value within a predetermined range, preferably 4 or 3 and the extraction of hand-in-hand words of the predetermined range is carried out with the extraction of words based on maximum hand-in-hand range dimension followed by consecutive hand-in-hand range words of lesser dimension and wherein the hand-in-hand words of a predetermined range is identified by taking sequential words in the order of their occurrence from the document and adding them together with a space.

15. The computer-implemented method as claimed in claim 9, wherein the Term Decomposition is carried out by comparing the Significant Single Value Term dataset and the Significant Multi Value Term dataset in such a way that every individual hand-in-hand range term that has at least one instance of any of the terms in Significant Single Value Term dimension are extracted as Keywords and the rest are decomposed.

16. A computer-implemented method of defining an appropriate topic to a document based on the document content comprises steps of:
   a. cleaning up the document's File Name to remove the file dot (.) extension and any alphanumeric characters;
   b. extracting a first few predefined number of words from the beginning of the document as a Document Header;
   c. comparing each word in the File Name and each word in the Document Header with every word in a Significant Single Value Terms data set to extract the words that match into a first and a second data set;
   d. comparing each word in the Document Header with every word in the File Name to extract the words that match into a third data set;
   e. transferring the data from the said individual data sets achieved in steps c and d into a fourth data set; thereafter processing the data/words to determine frequency of each word occurrence;
   f. comparing every word in Significant Multi Value Term data sets of a predefined range with the File Name to extract the hand-in-hand words that match in a fifth data set, wherein the hand-in-hand (HiH) words are words that go together as one word;
   g. comparing every word in the Significant Multi Value Term data set of a predefined range with the Document Header to extract the hand-in-hand words that match in a sixth data set;
   h. transferring the data from the individual data sets achieved in steps f and g into a seventh data set; thereafter processing the data/words to determine frequency of each word occurrence;
   i. comparing the data set achieved in step e, which consists of words of type Single Value Term and the data set achieved in step h, which consists of words of type Multi Value Term to extract those hand-in-hand words as Best Topic candidates that have at least one instance of any of the words of type Single Value Term using a computer; and
   j. defining an appropriate Topic based on predefined rules.

17. The computer-implemented method as claimed in claim 16, wherein the topic to a given document is defined based on predefined rules and thereafter, the Best Topic candidates' data set is checked to see, if there is only one such candidate, then that only one candidate is defined as the topic of the document and if there is more than one Best Topic candidate in the data set then the frequency of each Best Topic candidate is calculated based on matching the words in Best Topic candidate data set with the words in Significant Single Value Term data set to extract the corresponding frequency of each word that matches; thereafter adding up the individual frequencies of each word in the Best Topic candidate to derive the topic with highest frequency and if there are no Best Topic candidate's extracted, then the matching words from the comparison of Significant Single Value Term and File Name are chosen as per the sequence of the word occurrence in the File Name to define the topic of the document, but if there are no matching words extracted based on the comparison of words from Significant Single Value Term data set and File Name, then the collective words that are extracted based on various combination of comparison of words between the File Name, the Document Header and the Significant Single Value Term data set are now compared with the words in Significant Single Value Term data set and the term match that has the highest frequency in Significant Single Value Term data set is chosen as the topic of the document and if there are no matching words found from the various combination of comparison of words between the File Name, the Document Header and the Significant Single Value Term data set, then no topic is defined to the document by the method.

18. The computer-implemented method as claimed in claim 17, wherein the method extracts Keywords, KeyTerms, and the topic for every document processed based on the predefined rules and each cluster represents the topic and its related words in LMai index.

19. A computer-implemented system for automatically identifying Keywords, KeyTerms and Topics from a set of documents and thereafter automatically identifying the metonymical/related words by Latent Metonymical Analysis and Indexing (LMai), said system comprising:
   a. a document input module for providing unstructured data;
   b. an analyzer to identify similar words having singular and plural forms and to convert the words into one of the form;
   c. means for decomposing the words in a Significant Single Value Term data set and a Significant Multi Value Term data set to extract the Keywords of the document being processed;
   d. means for analyzing relationship between the Topics and the Keywords and thereafter indexing the Topics and their related Keywords, KeyTerms and their respective hand-in-hand terms into Metonymy cluster and KeyTerms HiH cluster respectively, wherein the hand-in-hand (HiH) terms are words that go together as one word;
   e. an indexing module for indexing/clustering Topics and their related words, and also KeyTerm and their HiH terms;
   f. a retrieval engine to analyze the Topics of each document during retrieval process to identify the Topic's that are related to each other based on a predefined threshold limit to retrieve the context based results from the index/cluster; and
   g. a display system to display:
      a. a link to take the user to content page; and
      b. Topic and significant Keywords extracted by the method to understand the content within the link without having to visit a result page.

20. The computer-implemented system as claimed in claim 19, wherein the documents are in any electronic format and the method is designed in a way to act as a plug-in to connect to any base search engine, which indexes and retrieves unstructured data, and said system utilizes the search results returned by the Base Search Engine to identify, if there is a relationship between the Topics in the Index.

21. The computer-implemented system as claimed in claim 19, wherein for every document returned by the Base Search Engine as a Search Result, the system extracts the corresponding Topic of the document from its Index and thereafter extracts a predefined set of Topics corresponding to the most relevant search results returned by the Base Search Engine and all those Topics that have a predefined frequency of co-occurrences are extracted as the Topics that are related to the Search Keyword.

22. The computer-implemented system as claimed in claim 19, wherein the Significant Single Value Term data set is identified from the given document by steps of:

a. retrieving words from the data set stored in sequential order as per their occurrences in the document;
b. eliminating special characters and/or word articles/words in the document by comparing with a list of pre-defined stop-words in order to obtain informative words in the document;
c. processing the informative words to determine the frequency of each word occurrence; and
d. sorting the processed words in order to extract a pre-defined number of words with highest frequency to identify the Significant Single Value Term.

23. The computer-implemented system as claimed in claims 19, wherein the Significant Multi Value Term data set is identified from the given document by steps of:
a. retrieving words from the data set stored in sequential order as per their occurrences in the document;
b. extracting hand-in-hand words of a predetermined range into appropriate data sets from retrieved words, thereafter extracting words of type Single Value Term that are left over by eliminating stop-words into a different data set;
c. processing the extracted words in each of the respective data set to determine frequency of each word occurrence; and
d. sorting the processed words in order to extract a pre-defined number of words with highest frequency in each of the respective data set to identify Significant Multi Value Term data sets of various predefined hand-in-hand range dimensions; and another data set with words of type Single Value Term, which is the residue after Significant Multi Value Term extraction.

24. The computer-implemented method as claimed in claim 9, wherein the method for identifying the Significant Single Value Term data set from the given document comprises steps of:
a. retrieving words from the data set stored in sequential order as per their occurrences in the document;
b. eliminating special characters and/or word articles/words in the document by comparing with a list of pre-defined stop-words in order to obtain informative words in the document;
c. processing the informative words to determine the frequency of each word occurrence; and
d. sorting the processed words in order to extract a pre-defined number of words with highest frequency to identify the Significant Single Value Term.

25. The computer-implemented method as claimed in claim 9, wherein the method for identifying Significant Multi Value Term data set from the given document comprises steps of:
a. retrieving words from the data set stored in sequential order as per their occurrences in the document;
b. extracting hand-in-hand words of a predetermined range into appropriate data sets from retrieved words, thereafter extracting words of type Single Value Term that are left over by eliminating stop-words into a different data set;
c. processing the extracted words in each of the respective data sets to determine frequency of each word occurrence; and
d. sorting the processed words in order to extract a pre-defined number of words with highest frequency in each of the respective data set to identify Significant Multi Value Term data sets of various predefined hand-in-hand range dimensions, and another data set with words of type Single Value Term, which is the residue after Significant Multi Value Term extraction.

\* \* \* \* \*